US011423296B2

(12) United States Patent
Bichler et al.

(10) Patent No.: US 11,423,296 B2
(45) Date of Patent: Aug. 23, 2022

(54) DEVICE AND METHOD FOR DISTRIBUTING CONVOLUTIONAL DATA OF A CONVOLUTIONAL NEURAL NETWORK

(71) Applicant: COMMISSARIAT A L'ENERGIE ATOMIQUE ET AUX ENERGIES ALTERNATIVES, Paris (FR)

(72) Inventors: Olivier Bichler, Massy (FR); Antoine Dupret, Orsay (FR); Vincent Lorrain, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 969 days.

(21) Appl. No.: 16/095,923

(22) PCT Filed: Apr. 27, 2017

(86) PCT No.: PCT/EP2017/060017
§ 371 (c)(1),
(2) Date: Oct. 23, 2018

(87) PCT Pub. No.: WO2017/186830
PCT Pub. Date: Nov. 2, 2017

(65) Prior Publication Data
US 2019/0156201 A1    May 23, 2019

(30) Foreign Application Priority Data

Apr. 27, 2016 (FR) ..................... 1653744

(51) Int. Cl.
*G06N 3/08* (2006.01)
*G06N 3/04* (2006.01)
*G06N 3/063* (2006.01)

(52) U.S. Cl.
CPC ............... *G06N 3/08* (2013.01); *G06N 3/049* (2013.01); *G06N 3/063* (2013.01)

(58) Field of Classification Search
CPC .......... G06N 3/08; G06N 3/049; G06N 3/063; G06N 3/0454
See application file for complete search history.

(56) References Cited

U.S. PATENT DOCUMENTS

| 7,237,055 | B1 | 6/2007 | Rupp | |
| 9,342,780 | B2* | 5/2016 | Snider | G06N 3/0635 |
| 2017/0200078 | A1* | 7/2017 | Bichler | G06N 3/0454 |

FOREIGN PATENT DOCUMENTS

| FR | 3 025 344 A1 | 3/2016 |
| WO | 2015/090885 A1 | 6/2015 |

OTHER PUBLICATIONS

Fukushima, "Neocognitron: A Self-Organizing Neural Network Model for a Mechanism of Pattern Recognition Unaffected by Shift in Position", Biological Cybernetics, vol. 36, Issue 4, pp. 193-202, Apr. 1980.

(Continued)

*Primary Examiner* — Sung S Ahn
(74) *Attorney, Agent, or Firm* — BakerHostetler

(57) ABSTRACT

A device for distributing the convolution coefficients of the least one convolutional kernel of a convolutional neural network is provided, the coefficients being carried by an input bus, to a set of processing units in a processor based on a convolutional-neural-network architecture. The device comprises at least one switching network that is controlled by at least one control unit, the switching network comprising a set of switches that are arranged to apply circular shifts to at least one portion of the input bus. For each convolution kernel, each control unit is configured to dynamically control certain at least of the switches of the switching networks in response to an input event applied to the convolution (Continued)

kernel and at least one parameter representing the maximum size of the convolution kernels.

14 Claims, 17 Drawing Sheets

(56) References Cited

OTHER PUBLICATIONS

Ciresan, et al., "Flexible, High Performance Convolutional Neural Networks for Image Classification", Proceedings of the Twenty-Second international joint conference on Artificial Intelligence—vol. Two, pp. 1237-1242, Jul. 16-22, 2011.
Mesa, et al., "An Event-Driven Multi-Kernel Convolution Processor Module for Event-Driven Vision Sensors", Solid-State Circuits, 47(2), pp. 504-517, (2012).
Feng, "A Survey of Interconnection Networks", Computer, IEEE Computer Society, vol. 14, Issue 12, pp. 12-27, Dec. 1, 1981.
Rathod, et al., "Parallel Routing Algorithms in Benes and Clos Networks: A Survey", International Journal of Advance Foundation and Research in Computer (IJAFRC), vol. 2, Issue 1, pp. 21-31, Jan. 1, 2015.

* cited by examiner

DEVICE AND METHOD FOR DISTRIBUTING CONVOLUTIONAL DATA OF A CONVOLUTIONAL NEURAL NETWORK

CROSS-REFERENCE TO RELATED APPLICATIONS

This application is a National Stage of International patent application PCT/EP2017/060017, filed on Apr. 27, 2017, which claims priority to foreign French patent application No. FR 1653744, filed on Apr. 27, 2016, the disclosures of which are incorporated by reference in their entirety.

FIELD OF THE INVENTION

The present invention generally relates to convolutional neural networks and in particular to a device and method for distributing the coefficients of at least one convolution kernel to processing elements in a processor based on a convolutional-neural-network architecture.

BACKGROUND

Artificial neural networks are computational models imitating the operation of biological neural networks. Artificial neural networks are mainly made up of neurons that are interconnected to one another by synapses that may be implemented by digital memories or by resistive components the conductance of which varies depending on the voltage applied across their terminals.

Convolutional neural networks correspond to a particular artificial-neural-network model. Convolutional neural networks were first described in the article by K. Fukushima, "Neocognitron: A self-organizing neural network model for a mechanism of pattern recognition unaffected by shift in position. *Biological Cybernetics*, 36(4):193-202, 1980. ISSN 0340-1200. DOI: 10.1007/BF00344251". Convolutional neural networks (which are also referred to as deep (convolutional) neural networks or even ConvNets) are feedforward neural networks inspired by biological visual systems.

Convolutional neural networks (CNN) are used in various fields in which (visual, audio, inter alia) signals are processed, such as for example in the field of image classification. However, the intrinsically parallel operation and complexity of conventional convolutional-neural-network classifiers has slowed their effective implementation in on-board systems.

Ways of implementing neural networks on graphic processing units (GPUs) have been proposed with a view to significantly improving the performance thereof, such as for example the solution described in the article by D. C. Ciresan, U. Meier, J. Masci, L. M. Gambardella, and J. Schmidhuber, "Flexible, high performance convolutional neural networks for image classification. Proceedings of the Twenty-Second International Joint Conference on Artificial Intelligence—Volume Two", IJCAI' 11, pages 1237-1242, 2011. ISBN 978-1-57735-514-4. DOI: 10.5591/978-1-57735-516-8/IJCA111-210.

A plurality of hardware implementations of spiking convolutional networks have in particular been proposed, firstly by L. Camunas-Mesa, C. Zamarreno-Ramos, A. Linares-Barranco, A. Acosta-Jimenez, T. Serrano-Gotarredona, and B. Linares-Barranco in "An event-driven multi-kernel convolution processor module for event-driven vision sensors." *Solid-State Circuits, IEEE Journal of,* 47(2):504-517, 2012. ISSN 0018-9200. DOI: 10.1109/JSSC.2011.2167409. Such a convolutional implementation uses a separate digital memory to store the coefficients of the convolution kernels and requires these coefficients of the kernel to be copied from the memory to the processing element each time a spike is received.

Existing hardware implementations of spiking convolutional networks are based on the use of a processor to compute the convolution layers of the convolutional neural network, the processor comprising at least one processing unit (such as a CPU) and digital memories storing the data.

In certain processor structures and for certain applications, the processing units must access a dataset in parallel. However, such an access to the data creates problems with routing and with concurrence of access to the data due to the parallel readout.

It is known to solve this access problem using switching networks. Switching networks are structures for distribution of data and for parallel communication. Multistage interconnection networks (MINs), such as butterfly networks, omega networks, baseline networks and cube networks, are known switching networks. Such networks are used to connect N inputs to N outputs with a plurality of switching stages. Their complexity in number of switches is $(N/2)*\log_2(N)$, this making them very compact. Butterfly, baseline and cube networks have a number of input/outputs that is a power of two whereas omega networks have a number of input/outputs that is a multiple of two. These networks are used in various architectures such as in parallel computing architectures, switching architectures, etc. MINs have been implemented in a number of parallel processors.

In existing solutions, a MIN may be produced with two types of switches, either two-state switches, or four-state switches. Two-states switches are controlled with one bit. In a so-called "uncrossed" state of the switches, the inputs are not switched. In a so-called "crossed" state, the inputs are switched. Four-state switches also have the two "uncrossed" and "crossed" states, but also have two additional states called the "pooling state" and the "depooling state".

In the case of four-state switches, conventional MINs are able to achieve any N to N connection. However, this type of switch is not compatible with analogue signals. Specifically, the pooling and depooling functions required the datum to transport routing information therewith, this not being possible with a voltage-coded analogue datum.

In particular, in a butterfly network, the first nodes have 4 to 4 switching structures, the nodes of higher depths being 8 to 8 networks, etc.

MINs are compact and effective. However, the number of inputs cannot be freely chosen, this implying a decrease in flexibility and/or the use of a memory that is larger than necessary. Moreover, this type of network is able to achieve only a limited number of circular shifts using two-state switches. MINs cannot therefore be used in processors based on a convolutional-neural-network architecture to allow data to be accessed in parallel.

SUMMARY OF THE INVENTION

The invention aims to improve the situation by providing a device for distributing the convolution coefficients of at least one convolution kernel of a convolutional neural network, said coefficients being carried by an input bus, to a set of processing units in a processor based on a convolutional-neural-network architecture, characterized in that the device comprises at least one switching network controlled by at least one control unit, the switching network comprising a set of switches that are arranged to apply circular shifts to at least one portion of the input bus. For each convolution kernel, each control unit is configured to dynamically control certain at least of the switches of the switching networks in response to an input event applied to the convolution kernel and at least one parameter representing the maximum size of the convolution kernels.

The invention furthermore provides a neuromorphic processor comprising a memory for storing the coefficients of convolution kernels and a set of processing units for computing the response of a neural network to an input event, the process comprising a routing device according to one of the preceding features for distributing the coefficients to the processing units.

Embodiments of the invention thus allow a set of processing units of a processor based on a convolutional neural network to access data stored in memory in parallel.

BRIEF DESCRIPTION OF THE DRAWINGS

Other features and advantages of the invention will become apparent with the aid of the following description and the figures of the appended drawings, in which.

The drawings contain, for the most part, elements of definite nature. They will therefore not only serve to allow the description to be better understood, but may, where appropriate, also contribute to the definition of the invention.

DETAILED DESCRIPTION

An artificial neural network (also called a "formal" neural network or referred to simply by the expression "neural network" below) consists of one or more layers of neurons, which are interconnected to one another. Each layer consists of a set of neurons, which are connected to one or more proceeding layers. Each neuron of a layer may be connected to one or more neurons of one or more preceding layers. The last layer of the network is called the "output layer".

The neurons are connected to one another by synapses, or synaptic weights (also called "weight coefficients" or "weightings" or "convolution coefficients"), which weight the strength of the connection between the neurons. The synaptic weights are adjustable parameters of the neural network and store the information contained in the neural network. The synaptic weights may be positive or negative.

The neural networks referred to as "convolutional" networks (or even "deep convolutional" networks or "convnets") are furthermore composed of layers of a particular type that may comprise convolutional layers, pooling layers and fully connected layers.

A neural network consists of one or more convolution layers, which layers may optionally include pooling layers. The convolution layers may be followed by a multilayer perceptron classifier.

The output of a convolution layer may be connected to the input of the following layer or to the output of the following layer. It may also be looped back to the input or be connected as an output to other types of layers that are not convolution layers.

In a given convolution layer, each neuron is connected to a sub-matrix of the input matrix. These submatrices are the same size. They are offset from one another regularly and may overlap. The input matrix may be of any size. However, the input matrix is generally 2-D when the data to be processed are visual data, the two dimensions corresponding to the spatial dimensions X and Y of a 3-D image if the image is a color image.

Figure 1:
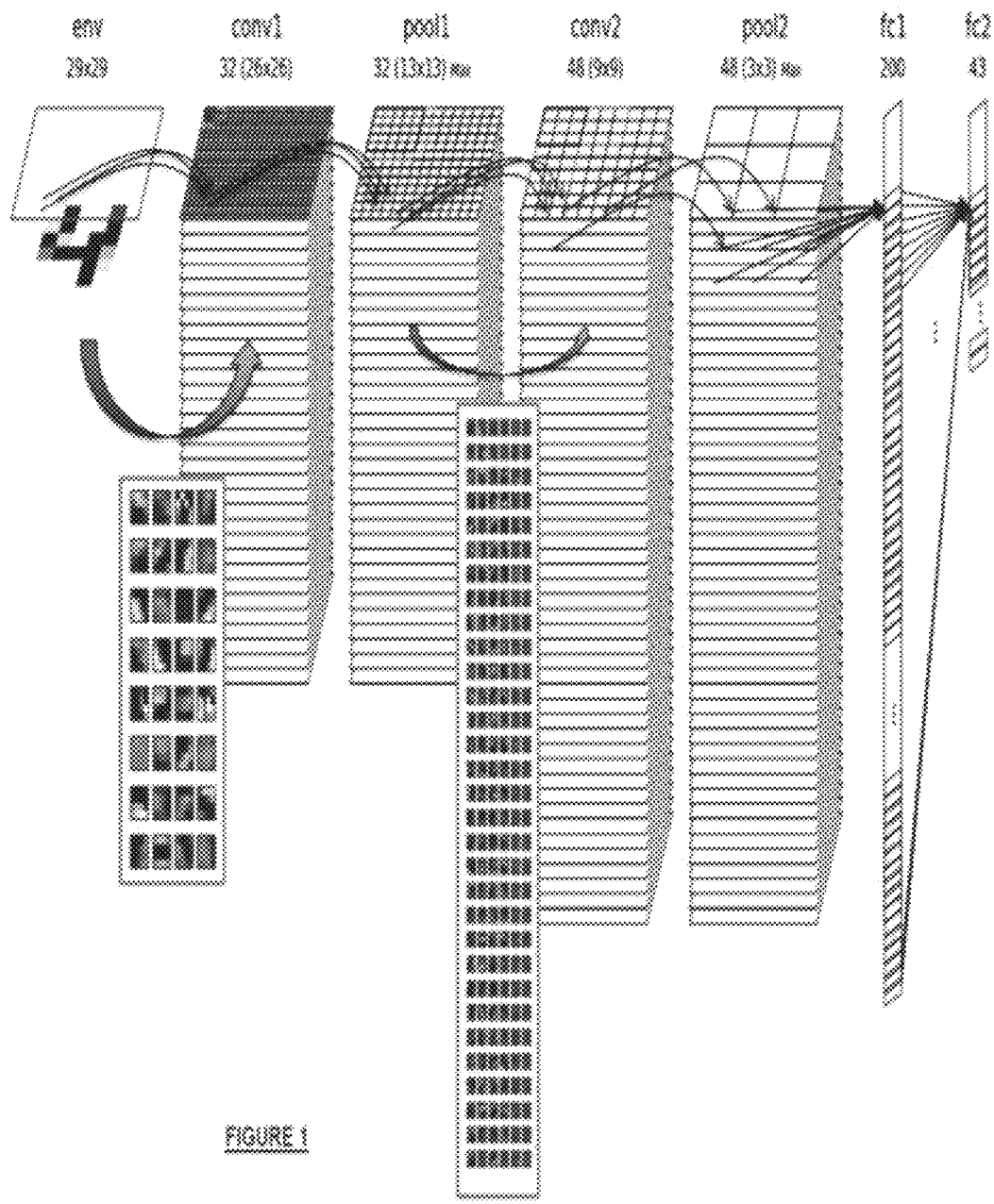
FIG. 1 shows an example of a convolutional network.

FIG. 1 shows an example of a simplified convolutional network, with an input layer "env" corresponding to the input matrix, two convolution layers, "conv1" and "conv2", and two fully connected layers "fc1" and "fc2". In this example, the convolution kernels are 5×5 pixels in size and they are offset from each other by 2 pixels (i.e. an offset or stride of 2):

"conv1" has an input matrix "env" and 6 different convolution kernels producing 6 output maps;

"conv2" has 12 different convolution kernels and therefore 12 output maps, and each output map receives input from all of the 6 output maps of the preceding layer.

In a neural network, the neurons are connected to their input sub-matrix/by the synapses the weight of which is adjustable. The matrix K of the synaptic weights that is applied to the input sub-matrices of the neurons is the same for all the neurons of a given output map (i.e. what is more commonly called a feature map). Such a matrix K is also called a "convolution kernel". The convolution kernel is thus shared by all of the neurons of a given output map O, and is therefore applied to all of the input matrix, this decreasing the memory required to store the coefficients, this optimizing performance. For example, for image recognition, this makes it possible to minimize the number of filters or intermediate representations that best code the features of the image and that are reusable in all the image. The coefficients of a convolution kernel K (i.e. the synaptic weights) may correspond to conventional signal-processing filters (Gaussian, Gabor, Laplace, etc. filters), or be determined by supervised or unsupervised learning, for example using a gradient-back-propagation algorithm, which type of algorithm is used in multilayer perceptron neural networks. The coefficients of the convolution kernels may be positive or negative and are generally normalized between −1 and 1, just like the input and output values of the neurons.

The neural networks may be transposed by spike coding. In this case, the signals propagated as input and as output of the layers of the network are no longer numerical values, but electrical spikes (similar to Dirac spikes). The information that was coded in the value of the signals (normalized between −1 and 1) is then temporally coded with the order of arrival of the spikes (rank-order coding) or with the frequency of the spikes.

In the case of rank-order coding, the arrival time of the spike is inversely proportional to the absolute value of the signal to be coded. The sign of the spike then sets the sign of the value of the signal to be coded. In the case of frequency coding, the frequency of the spikes, comprised between $f_{min}$ and $f_{max}$, is proportional to the absolute value of the signal to be coded. The sign of the spike sets the sign of the value of the signal to be coded. For example, considering an input matrix of the network corresponding to the brightness component of an image, normalized between 0 and 1, a pixel (or coefficient of the matrix) that is white, coded with a value 1, will emit spikes at a frequency $f_{max}$, a black pixel, coded by a value 0, will emit spikes at a frequency $f_{min}$, where as a gray pixel, coded by a value x, will emit spikes at a frequency $f=f_{min}+x(f_{max}-f_{min})$. The coding may also be pseudo-frequency coding, poissonian for example: in this case $f_{max}$ and $f_{min}$ are merely average frequencies. The initial phase of the spikes may be random.

The spikes may also originate directly from a sensor, such as an artificial cochlea or a retina, imitating the operation of their biological equivalent.

A neuron is defined by a value-limited, parameterized nonlinear algebraic function that has real what are called "input" variables depending on the neuron model used. A neuron is furthermore characterized by an activation function g( ), a threshold and the synaptic weights.

The model of the neuron is defined by a nonlinear algebraic function. This function may take as argument the integration value (representing the internal value of a neuron) but also, depending on the model, the time or the output of an internal counter. Such as used here, the expression "integration" means the integral with respect to time of the weighted spike trains input into the neuron (i.e. the temporal integral of a weighted spike train (a Dirac comb for example)). This integration may be reset to zero when the neuron triggers (i.e. produces an output spike).

A neuron firstly produces the sum h of the coefficients of its input submatrix weighted by the convolution kernel (in other words the scalar product of the input submatrix I and the matrix K), by applying an aggregation function g=<I, W>. The output of the neuron corresponds to the value of the neuron activation function g applied to this sum: g(h).

Conventionally, g may take the form of a sigmoid function, typically the hyperbolic tangent function.

In embodiments of spiking neural networks using frequency coding, the weighted sum h is computed by accumulating the coefficient of the convolution kernel 14 on each reception of a spike by the corresponding input. The activation function g of the neuron may in this case be replaced by a threshold. When the absolute value of h exceeds the threshold following the reception of a spike by the input sub-matrix, the output neuron emits a spike of the sign of h and resets the weighted sum h to the value 0. The neuron then enters into what is called a "refractory" period during which it can no longer emit spikes for a fixed period. The spikes may therefore be positive or negative, depending on the sign of h at the moment at which the threshold is exceeded. A negative spike as input converts the sign of the coefficient of the corresponding kernel for the accumulation.

A convolution layer may contain one or more convolution kernels that each have an input matrix (the input matrix of the various convolution kernels may be the same) but that have different convolution coefficients corresponding to different filters.

Figure 2:
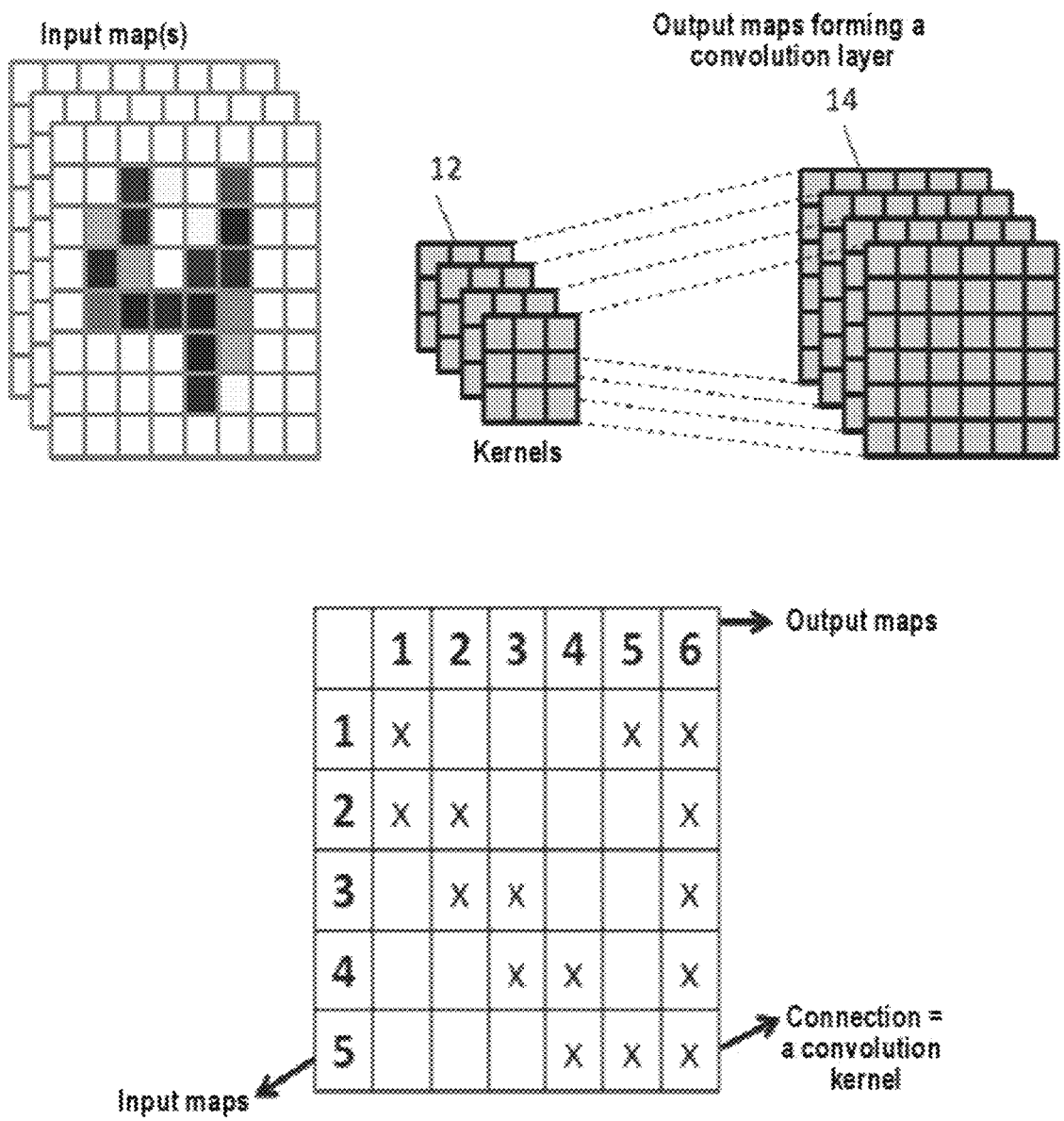
FIG. 2 is a schematic showing a convolution layer made up of a plurality of output maps.

As illustrated in FIG. 2, a convolution or pooling layer may consist of one or more output matrices 14 (also called output maps or more commonly output feature maps), each output map being able to be connected to one or more input matrices 11 (also called input maps).

Each convolution kernel 12 in a given convolution layer produces a different output map 14 so that the output neurons are different for each kernel. Convolutional networks may also include local or global pooling layers that combine the group outputs of neurons of one or more output maps. The outputs may be combined for example by taking, for the corresponding output, the maximum or average value of the outputs of the neuron group to the output map of the pooling layer. The pooling layers allow the size of the output maps to be decreased from one layer to the next in the network, while improving its performance by making it more tolerant to small deformations or translations in the input data.

Convolutional networks may also include completely connected perceptron layers.

Figure 3:
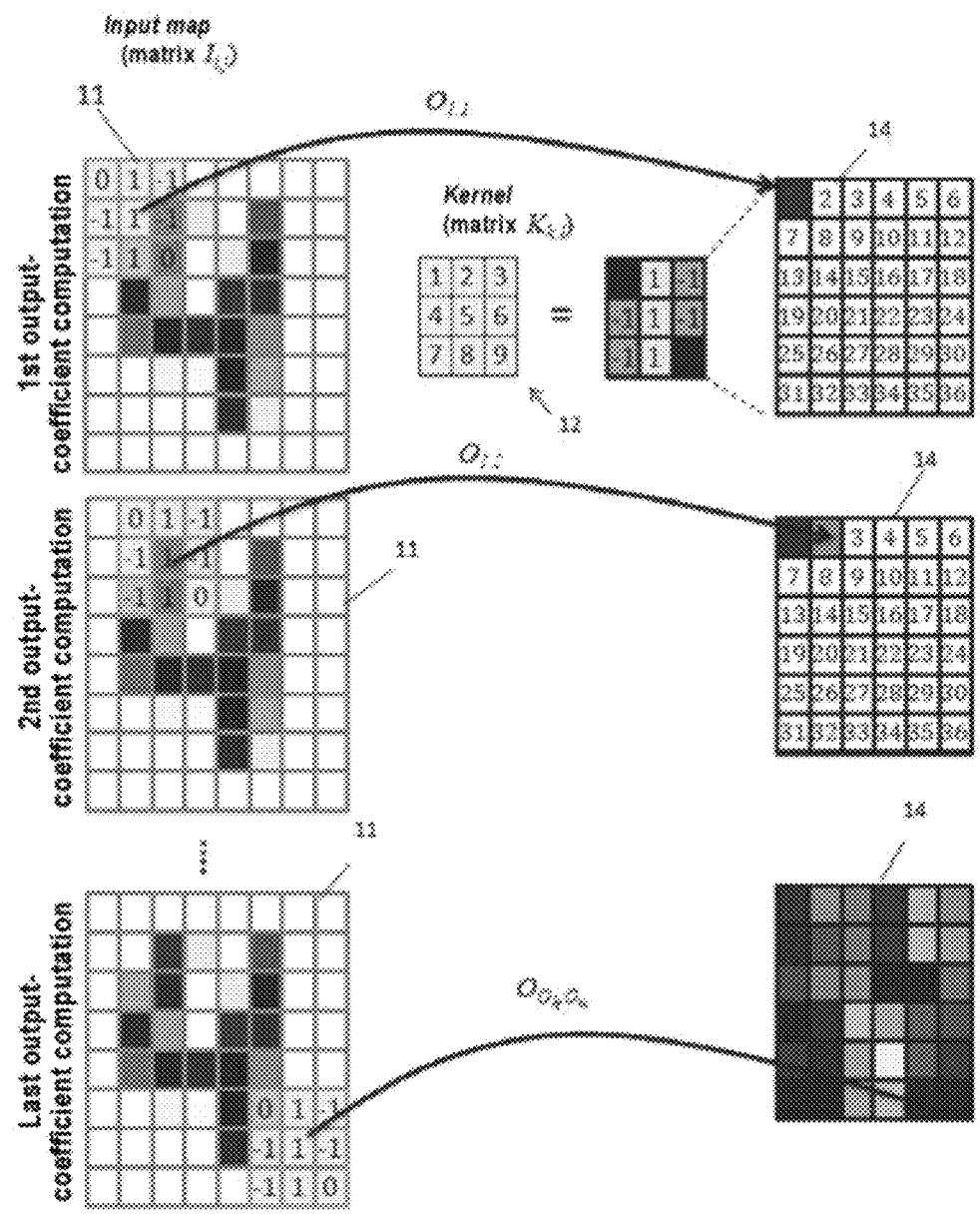
FIG. 3 illustrates the operating principle of a convolution layer in a convolutional neural network.

As illustrated in FIG. 3, an output matrix (14), denoted O, contains coefficients $O_{i,j}$ and has a size denoted ($O_h$, $O_w$). This matrix corresponds to a matrix of neurons and the coefficients $O_{i,j}$ correspond to the output values of these neurons, computed on the basis of the inputs and of the synaptic weights.

An input matrix or map 11 may correspond to an output map of a preceding layer or to an input matrix of the network that receives stimuli or a portion of the stimuli to be processed. A neural network may consist of one or more input matrices 11. It may for example be a question of RGB, HSV, YUV components or of any other type of conventional image component, with one matrix per component. An input matrix, denoted I, contains coefficients $I_{i,j}$, and has a size denoted ($I_h$, $I_w$). An output map O is connected to an input matrix I by a convolution operation, via a convolution kernel 12 denoted K (a convolution kernel is also called a filter, or convolution matrix), of size (n, m) and containing coefficients $K_{k,l}$. Each neuron of the output map 14 is connected to a portion of the input matrix 11, this portion also being called the "input sub-matrix" or "receptive field of the neuron" and being the same size as the convolution matrix K. The convolution matrix K containing the synaptic weights is common to all of the neurons of the output map O (the weights of the matrix K are then said to be "shared weights"). Each output coefficient of the output matrix $O_{i,j}$ then satisfies the following formula:

$$O_{i,j} = g\left(\sum_{k=0}^{min(n-1,l_h-i\cdot s_i)} \sum_{l=0}^{min(m-1,l_w-j\cdot s_j)} I_{i\cdot s_i+k, j\cdot s_j+l} \cdot K_{k,l}\right)$$

In the above formula, g( ) designates the activation function of the neuron, whereas $s_i$ and $s_j$ designate stride parameters giving the stride in two dimensions, in particular in a vertical dimension and in a horizontal dimension, respectively. Such a stride corresponds to the offset between each application of the convolution kernel on the input matrix. For example, if the stride is larger than or equal to the size of the kernel, then there is no overlap between each application of the kernel.

An output map O is connected to an input matrix I by a pooling operation that sub-samples the input matrix, this delivering a sub-sampled matrix. The sub-sampling may be of two types:

a sub-sampling of the type called "MAX pooling", according to the equation below:

$$O_{i,j} = g\left(\max_{k=0}^{min(n-1,l_h-i\cdot s_i)} \max_{l=0}^{min(m-1,l_w-i\cdot s_j)} I_{i\cdot s_i+k, j\cdot s_j+l}\right)$$

a sub-sampling of the type called "AVERAGE pooling", according to the equation below:

$$O_{i,j} = g\left(\frac{1}{n\cdot m}\sum_{k=0}^{min(n-1,l_h-i\cdot s_i)} \sum_{l=0}^{min(m-1,l_w-j\cdot s_j)} I_{i\cdot s_i+k, j\cdot s_j+l}\right)$$

The synaptic weights associated with the connections in the case of a pooling layer are generally unitary and therefore do not appear in the above formulae.

A completely connected layer comprises a set of neurons, each neuron being connected to all the inputs of the layer. Each neuron $O_j$ has its own synaptic weights $W_{i,j}$ with the corresponding inputs $I_i$ and carries out the weighted sum of the input coefficients with the weights, which is then passed to the neuron activation function to obtain the output of the neuron.

$$O_j = g\left(\sum_i I_i \cdot W_{i,j}\right)$$

The neuron activation function g( ) is generally a sigmoid function, such as for example the function tanh( ). For the pooling layers, the activation function may for example be the identity function.

Figure 4:
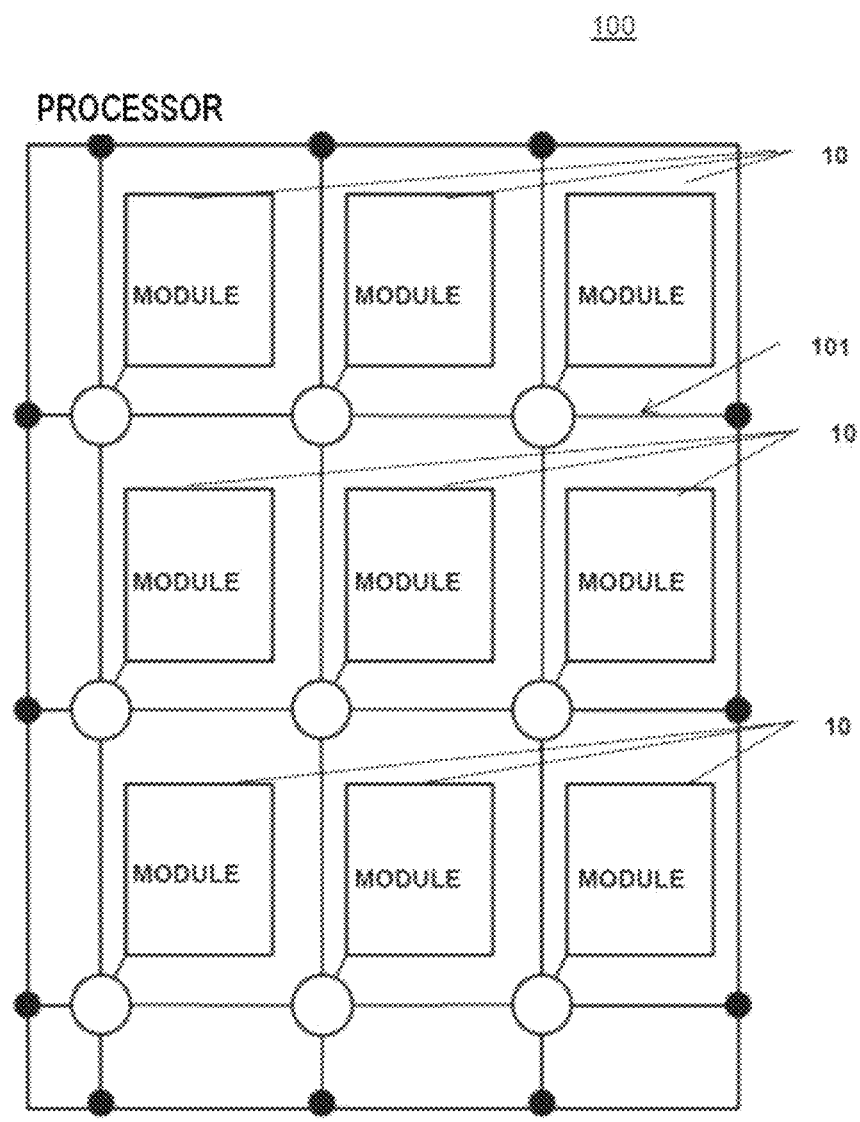
FIG. 4 shows an example of a convolutional-neural-network-based processor in which the data-routing device may be implemented, according to certain embodiments.

FIG. 4 schematically shows an example of a processor 100 based on a convolutional-neural-network architecture, in which processor a device for distributing data of at least one convolution kernel may be implemented, according to certain embodiments.

The processor 100 (also called a "neuromorphic processor") is configured to compute at least one convolution layer of a convolutional neural network. The processor may comprise at least one convolution module 10 (also called a "convolution block" or "convolution-processing module") that is configured to compute each convolution layer, each convolution layer consisting of one or more output maps of the convolutional neural network. The computation of a convolution layer consists in computing the internal value (also called the "integration value") of the neurons that have received an input event (such as a spike), such neurons being said to be "triggered" or "activated", and in computing the output value of these neurons. The computation of a convolution layer thus consists in determining the response of the neurons of the convolution layer to an input event (such as a "spike"). In embodiments in which the processor comprises a plurality of convolution-processing modules 10, the convolution modules 10 may be interconnected by an interconnect system 101, for example using a network on chip (NOC), programmable interconnect systems (e.g. FPGAs), static-routing interconnect systems, etc. The interconnect system 101 allows events to be redirected between the modules and/or the inputs/output and ensures the connection between the various layers of the neural network.

Each convolution module 10 performs a convolution operation on one or one portion of a convolution layer of the neural network. The convolution modules 10 may be used to compute different convolution layers. As a variant, each convolution module 10 may be used to realize a plurality of filters in a given convolution layer. In certain embodiments, when a convolution module 10 is not enough to compute a given convolution layer, a plurality of convolution modules may be used to compute the convolution layer.

In certain applications of the invention, the processor 100 may be a multicore distributed-memory processor, each core possibly being interconnected by an interconnect system, each processing module 10 forming a processing core that may be used to compute one or more convolution operations. The various convolution layers of the convolutional neural network are distributed over the various processing modules 10.

Figure 5:
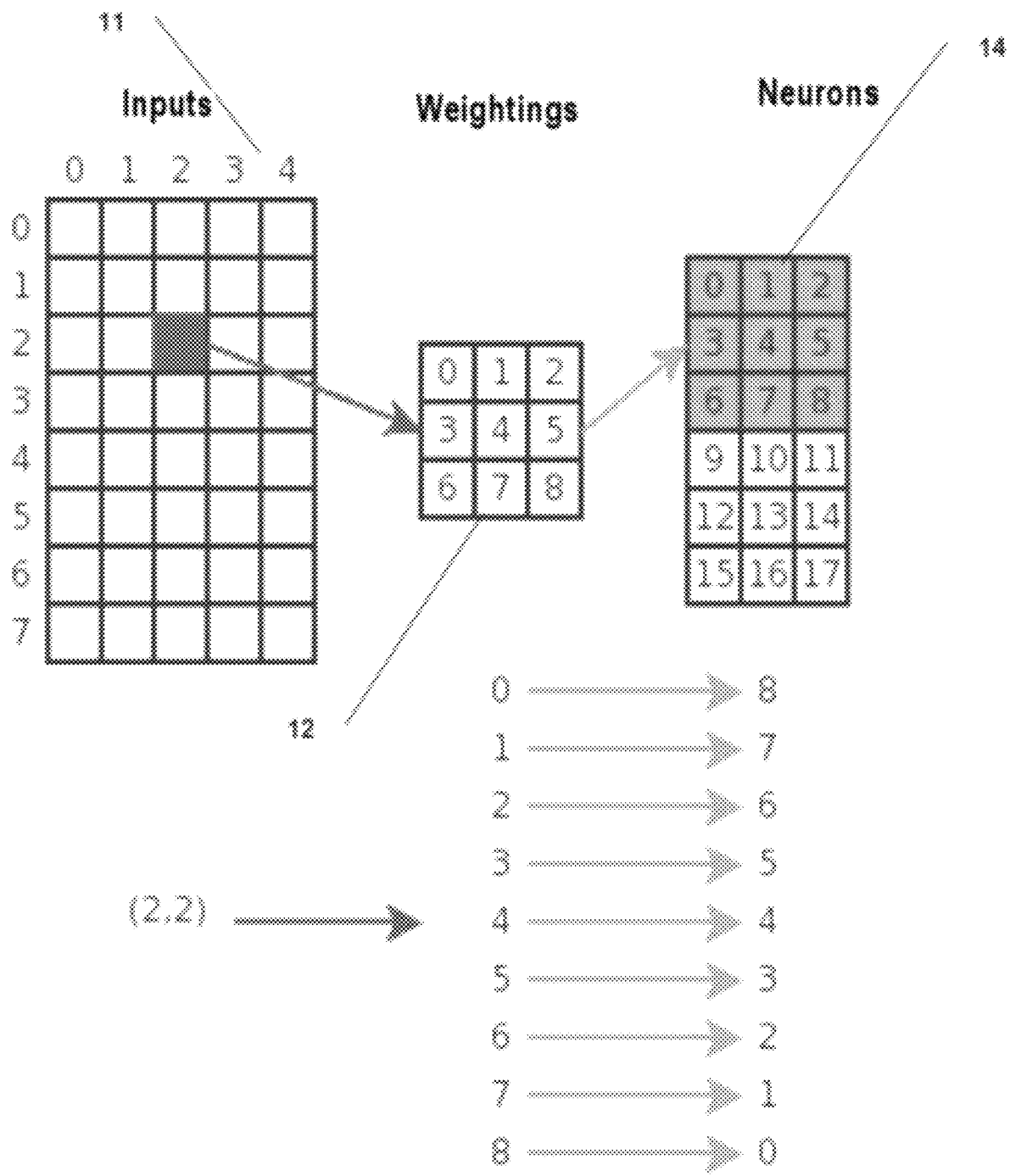
FIG. 5 illustrates the distribution of the weight coefficients depending on an input event.

FIG. 5 shows the distribution of the weight coefficients depending on an input event, for a spiking convolutional neural network.

Each processing unit may be configured to compute the value of independent neurons triggered by input events, depending on the weight coefficient associated with the processing element for each input event.

In one embodiment of a spiking neural network, the input event is represented by a spike received by the network. A spiking neural network may receive, over time, a train of spikes, each spike possibly triggering one or more neurons. The input event may then be defined by an input address in the convolution layer. The rest of the description will make reference to a spiking convolutional neural network in order to facilitate comprehension of the invention.

Such as used here, the "input address" of a spike is the address of the spike emitted by the preceding layer (input spikes) and received by the layer in question. In the system, the spikes may be transmitted by a series bus. The spikes therefore propagate therewith at least their emission address. The input address in the chosen coordinate system may comprise the coordinates of the input event on the input map.

In response to the emission of an event in the form of an electric spike (also called an "action potential") by an input neuron (pre-synaptic neuron), the spike passes through the synapses, this inducing a spike in a finite number of post-synaptic neurons that are then solicited. The connection between the output neurons and the input neurons on the input map means that this spike is not received by all the neurons of this layer. Such a property implies the existence of independent neurons in a layer, of the neural network 10, that is subjected to a spike. Two neurons are said to be independent if, for a given input event, they cannot trigger at the same time. Thus, for a given input spike, there are neurons that may not receive this spike, at the same time (such neurons being called independent neurons). According to certain embodiments, each processing module 10 may be configured to offload certain functions for groups of independent neurons of a given layer.

Figure 6:
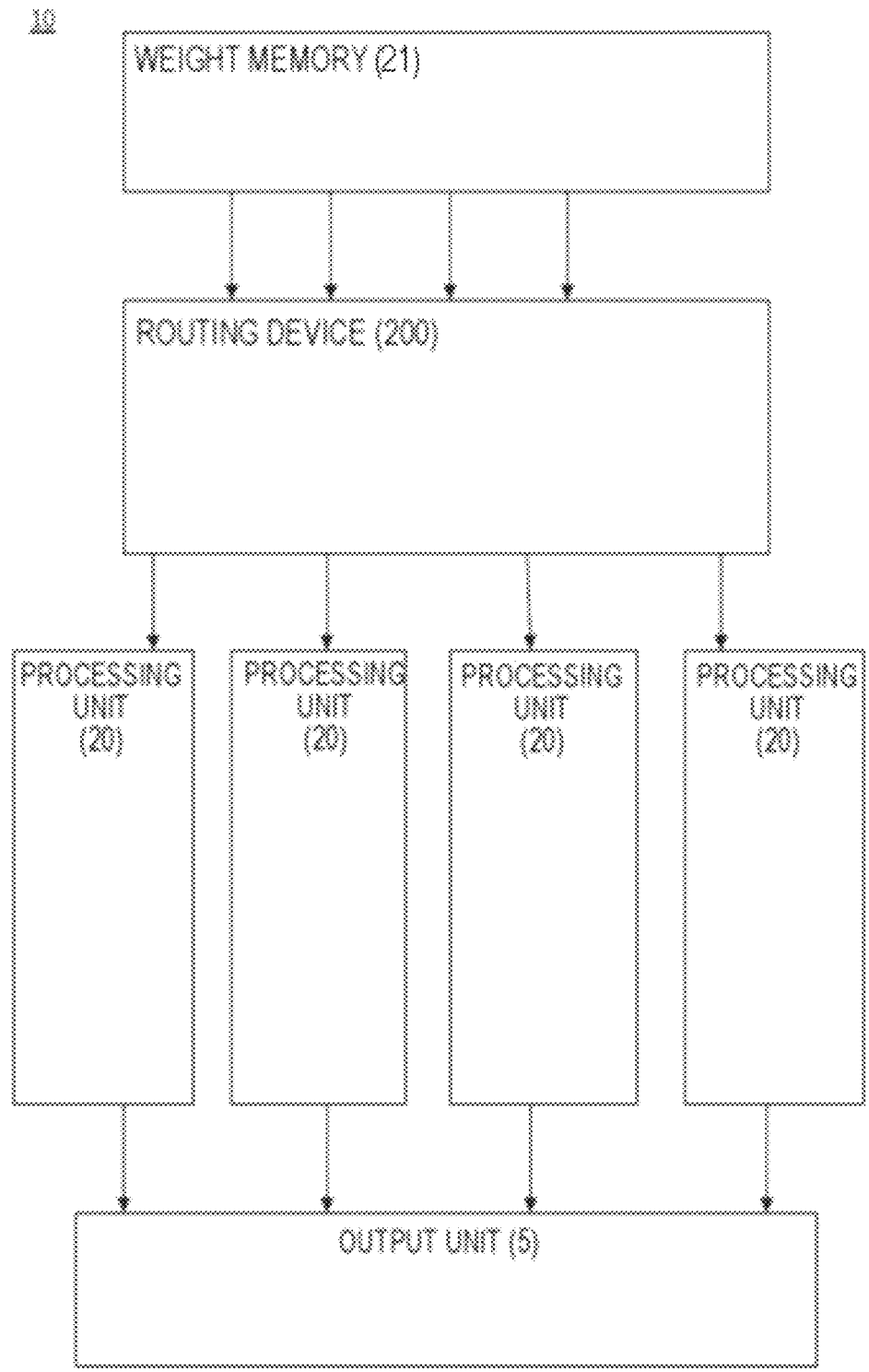
FIG. 6 shows the structure of a processing module of the convolutional-neural-network-based processor in which processor the data-routing device may be implemented, according to certain embodiments.

FIG. 6 illustrates the structure of a convolution module 10, according to certain embodiments. The convolution module 10 comprises one or more processing units 20 (also called "elementary processing units" or "processing elements"), such as elementary CPUs that are configured to compute the response of the neurons of a convolution layer to an input event (such as a "spike"). In response to the input event, the convolution module 10 is configured to distribute the coefficients of the convolution kernel 12 to certain at least of the elementary processing units 20 in parallel. According to certain embodiments of the invention, each convolution module 10 comprises a synaptic-weight memory 21 in which the coefficients of the convolution kernels (14) are stored, and a data-distributing device 200 (also called a "routing device" or "data-conveying device").

The weight-coefficient memory 21 is configured to store the convolution weights and is accessible for parallel read out by the various processing units 20.

In a given convolution layer, the neurons share the same weight coefficients (value of the convolution filter). In each processing module 10, the weight-coefficient memory 21 is distributed parallelly to the processing units depending on the input events. Thus, the weight-coefficient memory 21 is not redundant. Such a memory distribution allows memory space to be optimized.

For each input event applied to a convolution kernel, each processing unit 20 may be associated with a weight coefficient of the convolution kernel that is distributed by the data-distributing device 200 after circular shifting of the data of the input bus 201 that carries the coefficients from the memory 21.

The rest of the description will make reference to a spiking convolutional neural network. In such a network, the input event is a spike received by a convolution layer. This spike is emitted by the preceding convolution layer (input spike) and is received by the convolution layer in question. The spike may be defined by an input address, i.e. the address of the emitted spike. The spikes may be transmitted by a series bus and then propagate therewith at least their address.

The processing units 20 compute the response of a convolution layer to the input spike on the basis of weight coefficients distributed in parallel by the data-distributing device 200. The elementary processing units 20 then generate the output events depending on an input event for each triggered input neuron. The processing units 20 may depend on a chosen neuron model (also called a "computational neuron model"). The neuron model may be defined during programming of the system. In certain embodiments, the neuron model may be identical for all the neurons of a layer.

A spiking-neuron model generates a temporal integration of the information. The response of a neuron to a stimulation is the emission time of the next spike. A spike is emitted at the moment at which the excitation of the neuron exceeds a threshold. A virtual clock may be used to delay the emissions of spikes from the neurons, which spikes may then be considered to be dated events. There are several types of spiking-neuron models, such as for example:

The Hodgkin and Huxley (HH) model, which is defined by four interdependent differential equations;

The Integrate and Fire (IF) model, which is described by a single differential equation;

Models related to the IF model such as the Leaky Integrate and Fire (LIF) model or the Quadratic Integrate and Fire (QIF) model, the conductance Integrate & Fire (gIF) model;

The Spike Response Model (SRM), which is based on the behavior of neurons (phenomenological modelling of neurons) and on a kernel function;

The Izhikevich model (Izhikevich, 2003), which uses two differential equations.

Each processing unit 20 (also called a "sub-processor of the neuromorphic model") may represent one or more neurons. Each elementary data-processing unit 20 is configured to be able to generate an output value representing the output value of each neuron that it contains, which value results from the integration of the data received by the neuron. This temporal sum (representing a temporal integration) is determined using an activation function (also called the transition function or transfer function) that depends on the neuron model.

Each convolution module 10 comprises an output-managing unit 22 for delivering as output the values computed by the elementary processing units. This unit 22 may be configured to serialize the outputs of the processing units 20 and/or to create a pooling function. The output-managing unit 20 may comprise a concurrence system for managing the concurrence between the output events depending on predefined concurrence rules and a serialization unit configured to serialize the output events. In certain embodiments, the output-managing unit 22 may receive its input from a parallel data bus and deliver these data as output, one by one, to a series bus, in a predefined order of priority.

Figure 7:
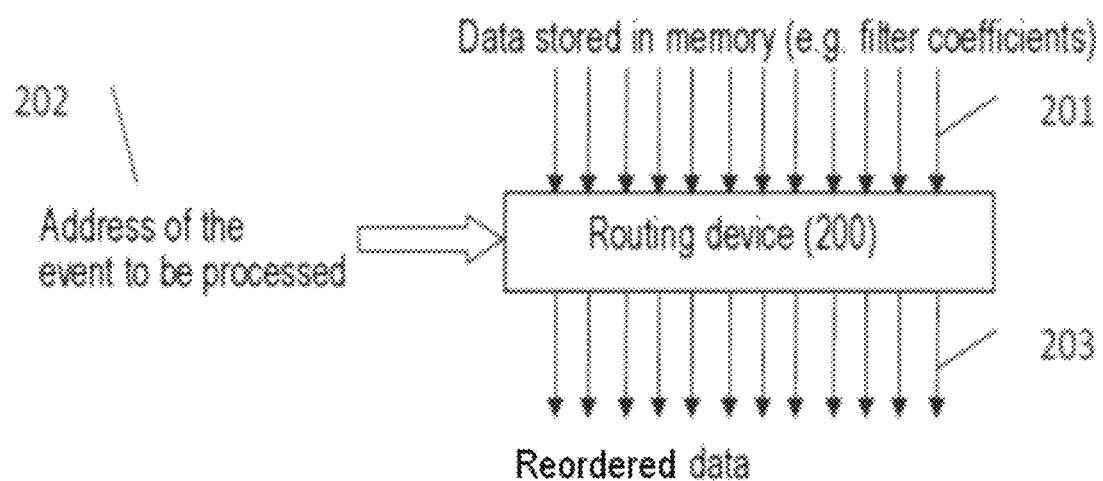
FIG. 7 shows the inputs/outputs of the data-routing device, according to certain embodiments.

FIG. 7 shows the inputs and outputs of the routing device 200, according to certain embodiments. in the values of the filter must be read in parallel depending on the coordinates of the spike input into the system. The routing device 200 is configured to control the distribution of the weight coefficients to the processing units 20 for the computation of a neuromorphic convolution layer and to allow parallel readout of the convolution filter by the processing units 20.

In particular, in a spiking convolutional neural network, the processing units 20 must be able to read in parallel values of the filter depending on the coordinates of the input spike of the processor 100, whereas the processing units do not read the same data at the same time.

The routing device 200 allows these data to be dynamically conveyed to the processing units 20, which allows a parallel readout of the data of the memory 2 (filter coefficients). As FIG. 7 shows, the routing device 20 receives the data of the memory 2 in the form of an input bus 201 from the memory 2 that stores the filter coefficients of the neural network. The routing device 20 furthermore receives the address of the input event to be processed 202 (called the "input address" below). The routing device 200 is configured to reorder the coefficients of the filters (data representing convolution kernels) depending on the input address, and delivers the reordered coefficients of the filter to the processing units 20 so as to be able to use the filter coefficients in parallel in the processing units 200.

The input address 202 of the convolution layer is the address of the point of application of the convolution kernel 12. The input address corresponds to the address of the spike emitted by the preceding layer (input spike) and received by the layer in question. In the system, the spikes may be transmitted by a series bus. The spikes therefore propagate therewith at least their emission address.

The input address may have two components X and Y depending on the format of representation chosen for coding the spikes. For example, the spikes passing through the layers of the neural network 10 may be coded in/according to the address-event representation (AER) format/protocol. In such a format, each spike is digital and consists of a train of bits coding the address (X, Y) of the destination of the spike along two perpendicular axes X and Y, the coordinate system (X, Y) corresponding to the coordinate system of the input matrix, and the sign of the spike. When a spike is received by the input matrix, the coded address (X, Y) represents the location of the input neuron to be activated. Thus, when a spike is received by the input matrix, its address (X, Y) gives the location $I_{i,j}$ to be activated with X→j and Y→i.

The routing device 200, placed between the filter-coefficient memory 2 and the processing units 20, thus changes configuration on each input event. The routing device 200 may be implemented for a maximum number of dimensions and a maximum convolution-kernel size (the convolution kernel is represented by a matrix). However, the routing device 200 may be parameterized for convolution-kernel sizes smaller than or equal to the maximum size, or even for a plurality of different convolution kernels.

The implementation of the routing device 200 may therefore be of any size. The routing device 200 may be based on a regular structure while scaling in terms of maximum matrix size and of number of dimensions.

Figure 8:
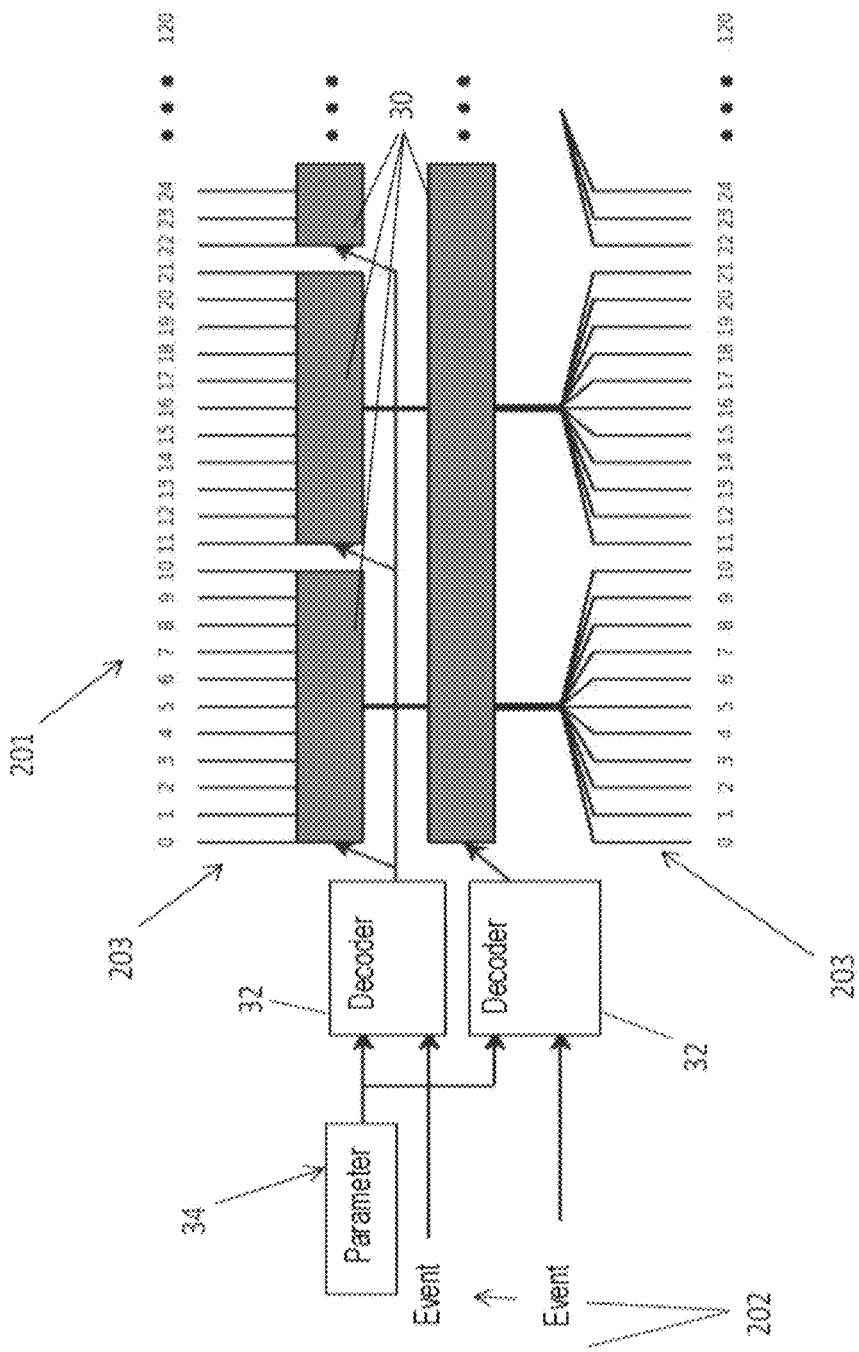
FIG. 8 shows the structure of the convolution-data-routing device, according to certain embodiments.

FIG. 8 illustrates the structure of the routing device 200 according to one embodiment.

According to one aspect of the invention, the routing device 200 comprises at least one switching network 30 that is controlled by at least one parameterizable control unit 32 (these control units are also called "decoders" below). Each switching network 30 is configured to apply circular shifts and/or sub-shifts to the input data bus 201 or to a portion of the bus 201 by shifting the values of the coefficients carried by the wires of the bus 201. Each wire (or "line") of the input bus 201 transmits or carries a coefficient of the analogue or digital convolution kernel. Each decoder 32 (also called a "control unit") is configured to control the switches 30 depending on the input address of the convolution kernel and of at least one parameter 34 representing the size of the convolution kernels to be processed.

According to certain embodiments, the routing device 200 may employ a tree layout (called the "shift tree" below) to convey the data from a convolution filter to the processing units 20.

The tree layout is constructed by the routing device depending on the maximum size of the convolution filter to be processed. The tree may furthermore be constructed on the basis of other parameters that may comprise:

The size of the input bus 201; and/or
The division (or "segmentation") of the input bus into portions; and/or
The depth of the tree.

The size of the input bus 201 may be defined as being equal to the number of elements in the maximal convolution filter. The segmentation of the input bus may be defined as being equal to the number of columns (of rows, respectively) of the convolution filter in its matrix representation (12) or more generally on the basis of this number of columns (of rows, respectively). The depth of the tree may be defined as being equal to the number of dimensions of the convolution filter or, more generally, on the basis of this number of dimensions. The depth of the tree thus defines the number of levels of the tree.

The rest of the description will be given, by way of nonlimiting example, with reference to an input bus segmented according to a columnwise segmentation of the convolution matrix, each sub-bus comprising the components (convolution coefficient) of one column of the convolution matrix.

Each node of the tree represents one switching network 30 that is configured to apply circular shifts to a data vector representing the input convolution coefficients of one portion of the input bus 201, or circular shifts to sub-sets (corresponding to the inputs of sub-buses 2010) of this vector.

According to certain embodiments, each level of the tree corresponds to a given dimension of the coordinate system in which the convolution matrix is represented. The switching networks arranged in a given level of the tree may advantageously be configured to apply circular shifts, to the data received as input, in the dimension of the chosen coordinate system which is associated with the level of the tree (the coordinate system being used to represent the elements of the neural network).

Figure 9:
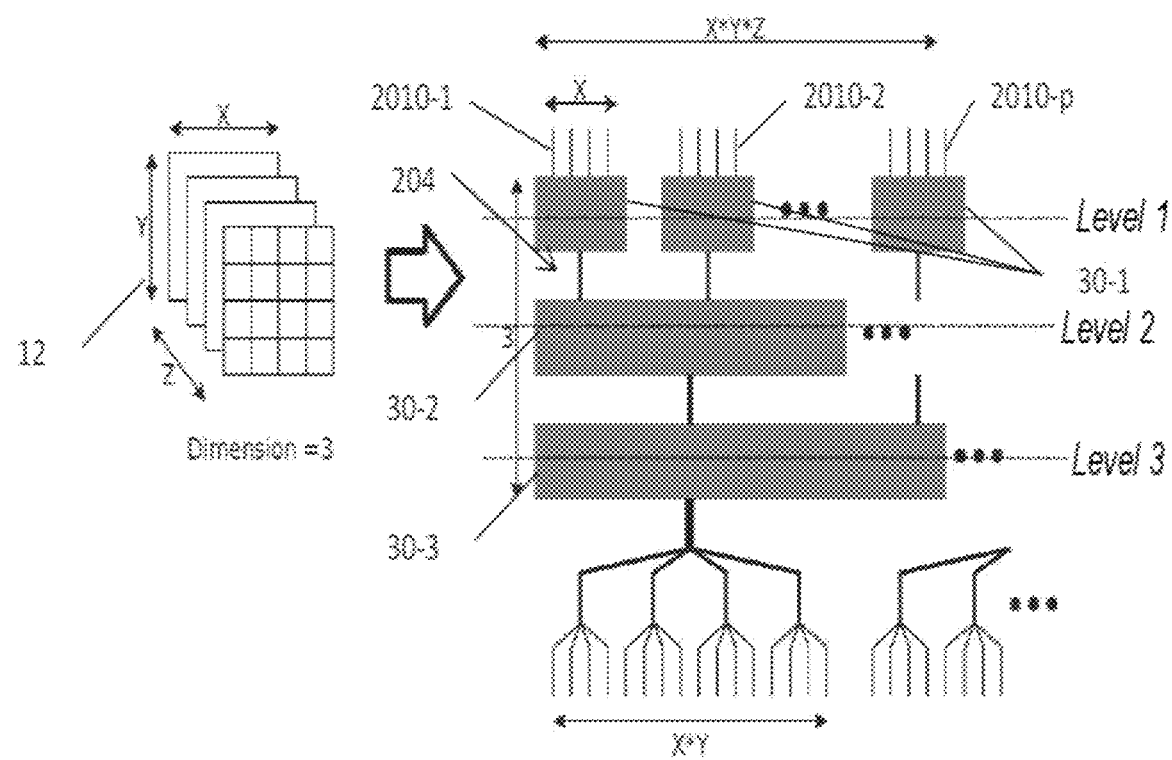
FIG. 9 illustrates the structure of a routing device that is dynamically configurable from a shift-tree topology, according to certain embodiments.
Figure 10:
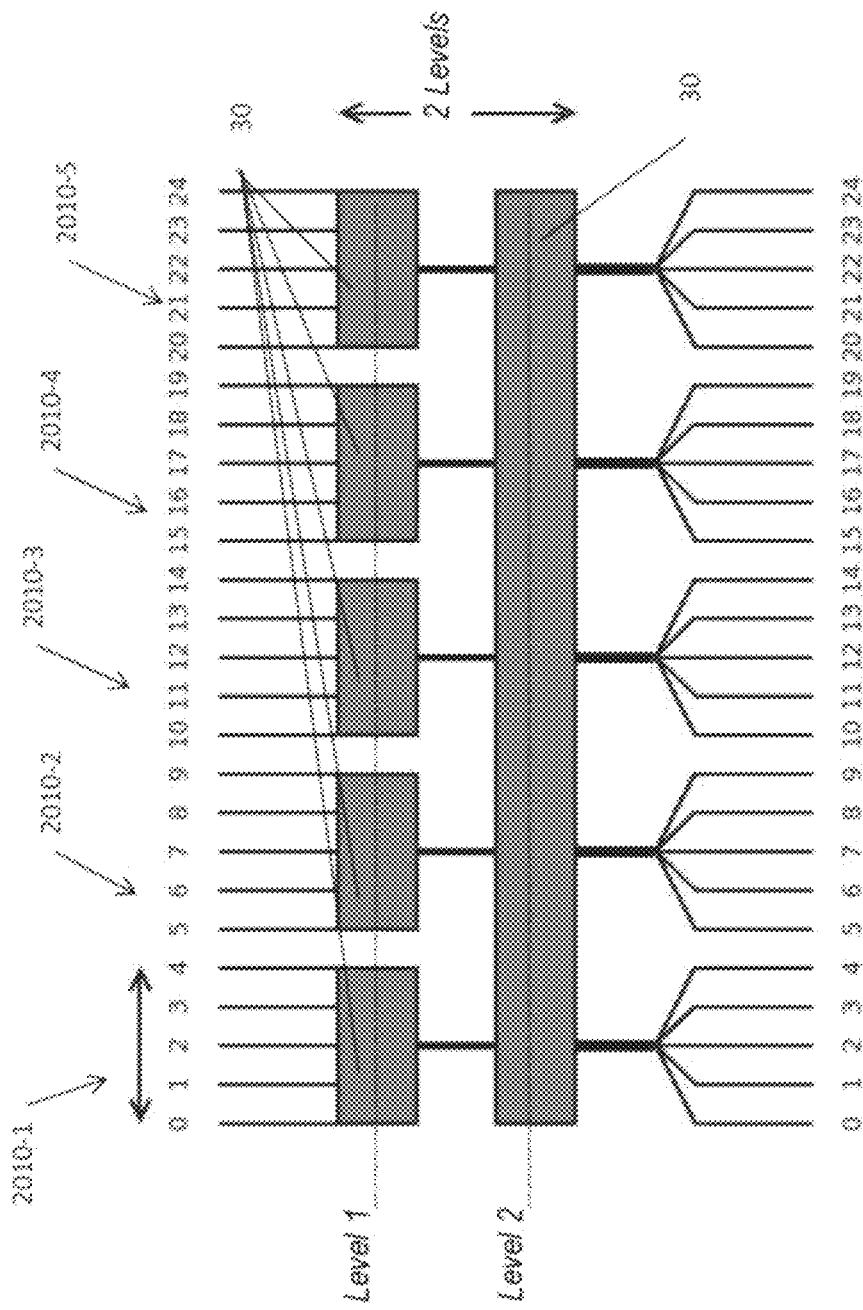
FIG. 10 shows an example of implementation of the convolution-data-routing device for a 5×5×1 maximum filter, according to certain embodiments.

FIG. 9 illustrates the equivalence between a maximal convolution filter and the tree topology, according to certain embodiments. In the example of FIG. 10, the matrices of the neural network, and in particular the convolution matrices 12, are represented in a three-dimensional coordinate system (X, Y, Z). With a columnwise segmentation, the number of columns of the convolution matrix being equal to p, the input bus 201 may be divided into p sub-buses {2010-1, . . . , 2010-p}, each sub-bus containing the components of one column of the convolution matrix. It should be noted that each convolution coefficient in the convolution matrix may be associated with an address or position defined by coordinates in the used coordinate system.

In the example of FIG. 9, since the coordinate system has 3 dimensions X, Y and Z, the shift tree has 3 levels, each level being associated with one dimension of the coordinate system. The switching networks 30 in a given level of the tree are therefore configured to apply circular shifts, to the received data, in the dimension associated with this level of the tree. For example, the switching networks 30-1 of level 1 circularly shift the sub-buses 2010-i (components of each column i of the convolution matrix) along the X-axis, the switching networks 30-2 of level 2 circularly shift the outputs of the level-1 switching networks along the Y-axis, and the switching networks 30-3 of level 3 circularly shift the outputs of the level-2 switching networks along the Z-axis.

FIG. 10 shows an example of a tree layout for the routing device 200 that is suitable for processing a maximal convolution matrix of 5×5 size in a two-dimensional coordinate system (X, Y). The input bus 201 therefore contains 25 elements (5×5). The number of columns of the convolution matrix being equal to 5, 5 sub-buses 2010 of 5 elements (denoted {20101-1, . . . , 2010-i, . . . , 2010-5}) may be created. Since the filter has two dimensions (2-D matrices defined along two axes X, Y), the depth of the tree is 2 (the tree has two levels).

Each of the sub-buses 2010 may be switched independently from the other sub-buses by a separate switching network 30 (sub-shifts in the X-dimension), in the first level of the tree (5 switching levels in level 1 of the tree). The outputs of the 5 sub-buses 2010 may be collected together in an intermediate bus 204 comprising 5 elements (5 wires).

The data of the secondary bus 204 may be switched by a switching network that is arranged in a second level of the tree, which receives as input the data of the secondary bus 204 (shift in the Y-dimension).

The tree thus created therefore includes 5 modes in the first level and one node in the second level.

Each switching network 30 may consist of a set of circular-shift operators 30, called "switches" below. The switches 30 may be 2-state switches and be distributed in superposed strata (also called "layers" below) on the lines of the bus. A switching layer may apply a circular shift. Each layer thus shifts the data by a chosen number of lines of the bus to the right. Values to the right are not discarded but brought back to the left. The switching layers may together apply any useful circular shift.

Figure 11:
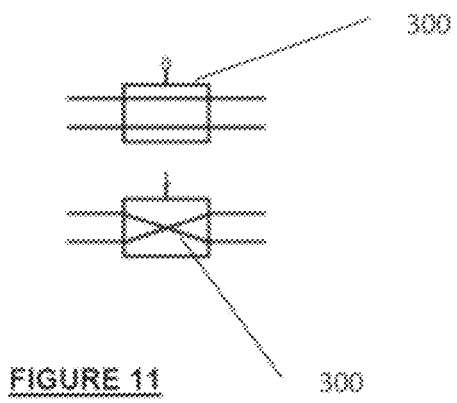
FIG. 11 is a schematic showing an example of two-state switches which is able to be used in switching networks, according to one example embodiment.

FIG. 11 shows an example of a two-state switch 300 that may be used in each switching network 30. A two-state switch 300 may be controlled with one bit. In the so-called "uncrossed" state of the switch 300 (shown at the top of the figure), the inputs are not switched. In the so-called "crossed" state (shown at the bottom of the figure), the inputs are switched.

Figure 12:
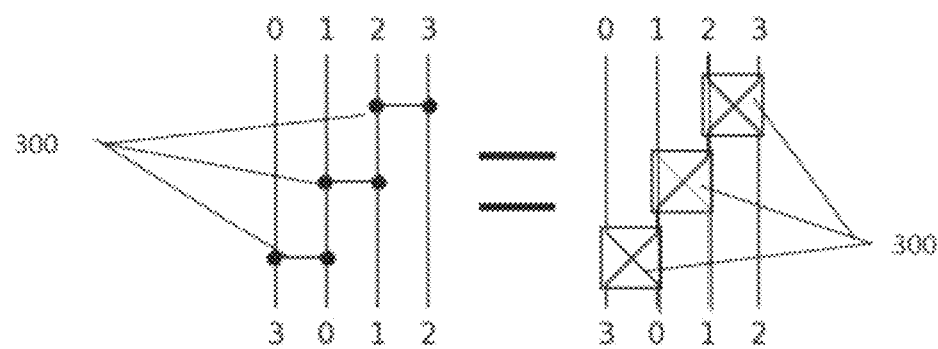
FIG. 12 is a schematic illustrating two-state switches distributed in strata on the bus lines, according to one example embodiment.

FIG. 12 shows in two situations (left-hand part and right-hand part of the figure) an example of a switching network 30 comprising 3 two-state switches 300 that are distributed in strata on the bus lines carrying the values 0, 1, 2, 3.

The three switches 300 apply a circular shift that modifies the order of the initial data {0, 1, 2, 3}. The switching network 30 thus delivers the data {3, 0, 1, 2} reordered by circular shifting.

The switching network 30 may be configured to apply circular shifts of different degrees to the N wires of the input sub-bus 2010 with which it is associated. Specifically, each stratum of switches may act on lines that are separated to a greater or lesser extent. The distance between two switched lines in a given stratum defines the degree of this stratum.

Figure 13:
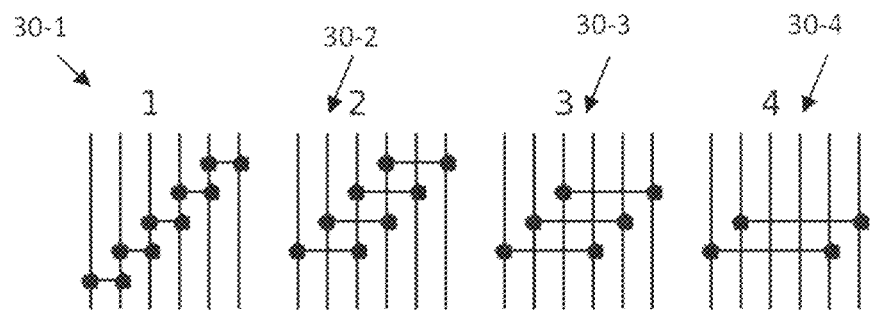
FIG. 13 is a schematic illustrating strata of switches of different degrees, according to another example embodiment.
Figure 14:
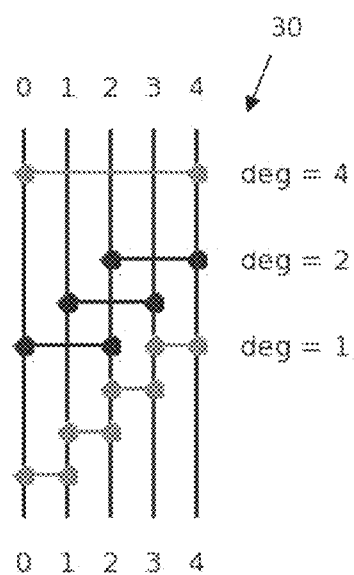
FIG. 14 shows an example of a switching network fora 5-line bus with $2^n$-type switching layers.

FIG. 13 shows examples of switching networks 30-1, 30-2, 30-3 and 30-4 comprising switches that are configured in strata of various degrees:
- the strata of switches of the switching network 30-1 are of degree 1;
- the strata of switches of the switching network 30-2 are of degree 2;
- the strata of switches of the switching network 30-3 are of degree 3; and
- the strata of switches of the switching network 30-4 are of degree 4.

The circular shifts to be applied may be defined by shift numbers. A shift number may define the circular shift to be applied. Thus, a shift number of "1" may trigger the application of a circular shift to the right, a shift number of "2" may trigger the application of two circular shifts to the right, etc. According to one preferred embodiment, a bus of N lines is at most shifted N−1 times.

The circular shifts supplied by the strata (or "layers") of switches 300 may add. Thus, for example, it is possible to use a layer of switches of degree 2 with a layer of degree 1 to make the same shift as a layer of degree 3.

In one embodiment, the degrees of the layers of switches 300 used in each switching network 30 of the routing device 20 may correspond to the sumwise decomposition of the circular shifts of the bus 201 and of all the sub-buses 2010. Thus, the switching network 30 may apply any circular shift to the input bus and/or its sub-buses. In addition, the layers of switches 300 in each switching network 30 may preferably be arranged in order of decreasing degree.

In one particular embodiment, the degree of the layers of switches 300 in each switching network 30 may be set to 2 power n ($2^n$) with $n \in [0, \lfloor \log 2(N) \rfloor]$. In the case of a 5-line bus (N=5), it is therefore possible to use 3 layers of switches 300 for each switching network 30, each layer being respectively of degree 4, 2 and 1. FIG. 13 shows an example of such a switching network 30 including 3 layers of $2^n$-type switches for a 5-line bus. In the example of FIG. 13, the switching network includes a first layer of degree 4 (including 1 switch 300), a second layer of degree 2 (including 3 switches 300) and a third layer of degree 1 (including 4 switches 300).

With such layers the degree of which is set to $2^n$, it is possible to apply circular shifts of 1 to 7=4+2+1 and of every intermediate value. Such a decomposition into layers of switches of degree $2^n$ has a complexity in number of switches 30 equal to:

$$\sum_{n=0}^{\lfloor \log 2(N) \rfloor} (N - 2^n) = N \cdot (\lfloor \log 2(N) \rfloor + 1) - 2^{\lfloor \log 2(N) \rfloor + 1} + 1 \approx N \cdot \log 2(N)$$

The complexity thus obtained is low and close to that of conventional MINs.

Figure 15:
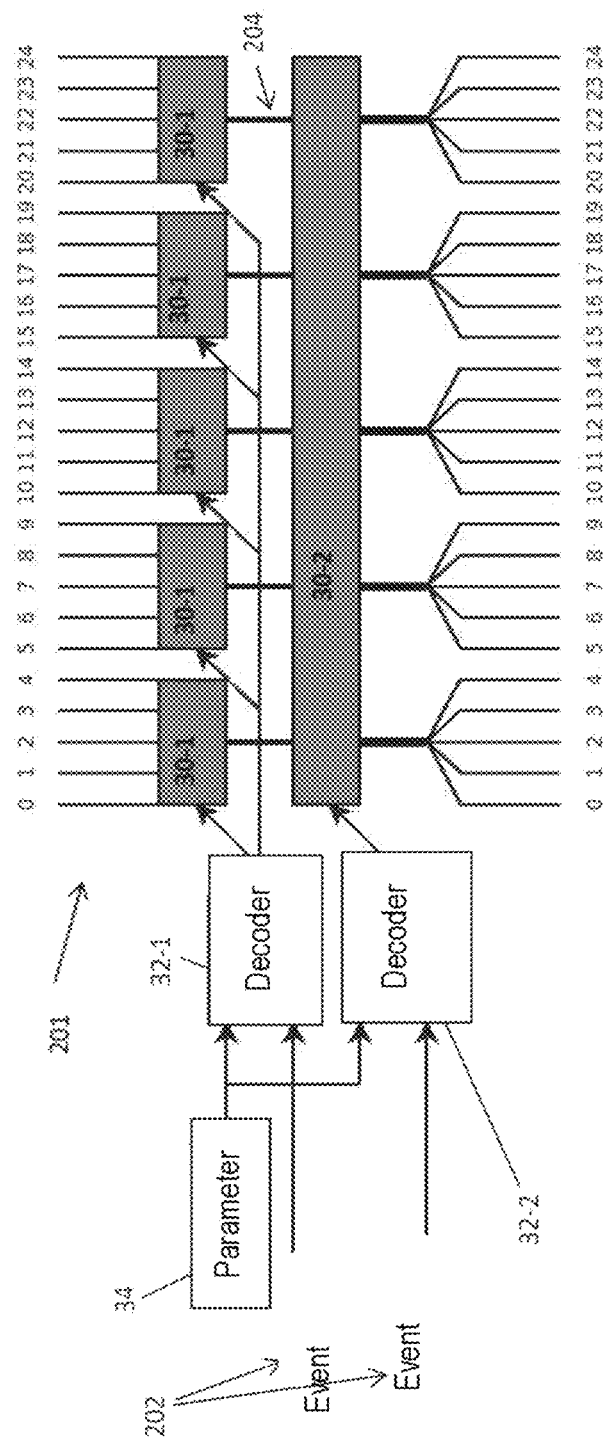
FIG. 15 shows an example of a shift tree for a 5×5×1 maximum filter.

FIG. 15 shows an example of a routing device 200 the elements of which are arranged in a tree layout, for a maximal convolution matrix of 5×5×1 size.

According to certain embodiments, the switching networks 30 located at the same depth in the tree (same level of the tree) share the same decoder 32. Thus, with each level of the tree is associated at least one decoder 32 that is configured to control the switching networks 30 arranged in this level. In these embodiments, the total number of decoders 32 is at least equal to the depth of the tree. For example, if the tree has a depth of 2, 2 independently controlled decoders (1 for each depth) are used. Such a decoder arrangement allows the amount of control logic to be decreased.

Each decoder 32 associated with a given level of the tree is configured to dynamically activate the switches 300 of the switching networks 30 that are arranged in this level of the tree so as to modify the number of applied shifts depending on the event and on a input configuration in particular defined by the address of the input event. Thus, in the example of FIG. 15, the decoder 32-1 is configured to dynamically control the activation of the switches 300 of the switching networks 30-1 of the first level depending on the input event, whereas the decoder 32-2 is configured to dynamically control the activation of the switches 300 of the switching networks 30-2 of the second level.

The decoders 32 may inhibit certain switches 300 of the switching network 30 in order to create independent shifting sub-spaces. On the basis of these sub-spaces, sub-trees and sub-sets of the input vector of the switching network may be created. One switch 300 may be inhibited for all the layers of all the stages. In one embodiment, the switches 300 of a given layer are activated at the same time.

The input configuration may be used by the routing device 200 to determine the number of lines of the input bus 201 to which a circular shift is to be applied. The input configuration may be common to the various decoders 32. The input configuration may be used after the construction of the tree to set the size of the processed convolution.

Figure 16:
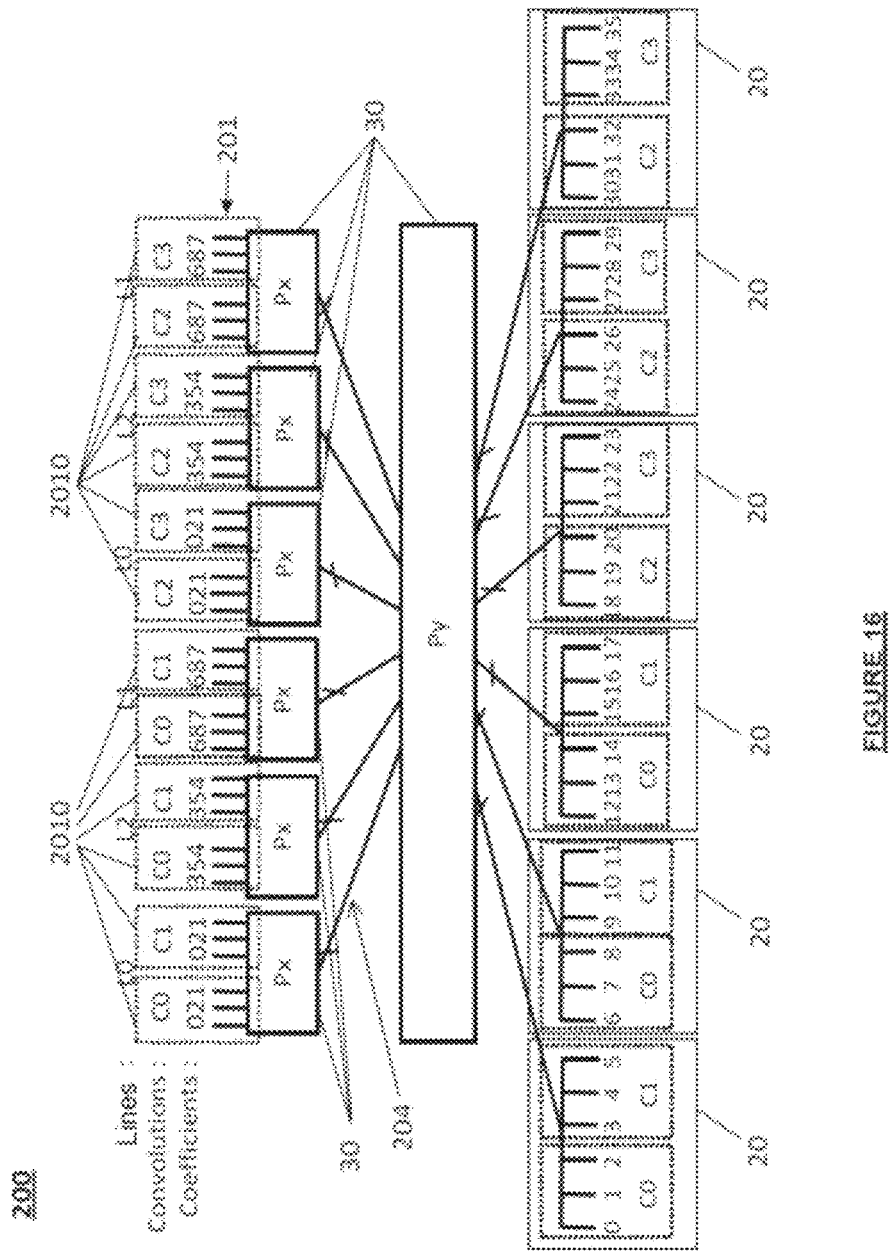
FIG. 16 is a schematic of the routing device for a multi-convolution, according to one example embodiment.

The routing device 200 may process one or more convolutions at the same time depending on the number of shifts to be applied with respect to the size of the input bus, as illustrated by FIG. 16. FIG. 16 shows the shift-tree layout used to dynamically configure the switching networks 30 depending on an input event for each convolution kernel C0, C1, C2, C3. Each convolution uses 3 switching networks Px (30) in the first level of the tree to apply circular sub-shifts in the X-dimension and one switch Py (30) in the second level of the tree to apply shifts in the Y-dimension. In each level and for each convolution kernel, at least one decoder 32 (not shown in FIG. 16) may control the switching networks using one control word for each switching network, the control word containing as many bits as there are switches 300 in the switching network 30. The value of each bit in the control word controls the activation state of the associated switch 300.

The circular shifts thus applied to the various input sub-buses 2010 thus allow the coefficients carried by the wires of these sub-buses to be reordered. The routing device 200 then distributes the coefficients thus reordered to the processing units 20. For example, the coefficients {021} of the convolution C0 of the row L0 of the convolution matrix (for a row-wise segmentation of the convolution the matrix) and the coefficients {3,5,4} of the convolution C1 of the row L2 of the convolution matrix are distributed after reordering ({012} for C0, L0 and {345} for C1, L2) to the same processing unit 20. Each processing unit receives only a single value.

The various filters may be segmented (or divided) row-wise. These rows may then be concatenated on a sub-bus. The following sub-bus contains the following rows. Once all these rows of these filters have been placed, the following filter is processed. In one preferred embodiment, a row cannot be segmented in order to place it on 2 sub-buses. For example, considering 11 sub-buses of 11 elements (i.e. 121 elements), on a given sub-bus, it is possible to place 3 rows of 3 different 3×3 filters. The 3 filters use 3 sub-buses, i.e. 33 elements (wires). It is therefore possible to form 9 3×3 filters.

In certain embodiments, if the number of shifts to be applied is lower than the size of the input bus 201 having a total number of lines equal to N, the routing device 200 may perform the line permutations as follows:
  if the number of lines to be switched is larger than half the total number of lines (N/2), the routing device 200 applies the permutation a single time to the input bus 201 (for example a permutation of 4 input elements of a bus 201 of 5 elements is performed);
  else, if the number of lines to be switched is lower than N/2, the permutation may be applied as many times as possible. For example, a permutation of 2 input elements of a bus 201 of 5 elements may be applied 2 times to the bus in order to process two 2×2 convolutions at the same time. According to one feature, unused values may not be switched and keep their initial position.

The decoders 32 may implement a switch-activating method to determine the switches 300 to be activated in the switching networks 30 for an input configuration and for a circular data permutation (the permutation possibly being defined by a shift number), and while taking into account the topology of the switching networks. The activating method (also called the "configuring method") may be applied for any possible shift and any possible input configuration.

Figure 17:
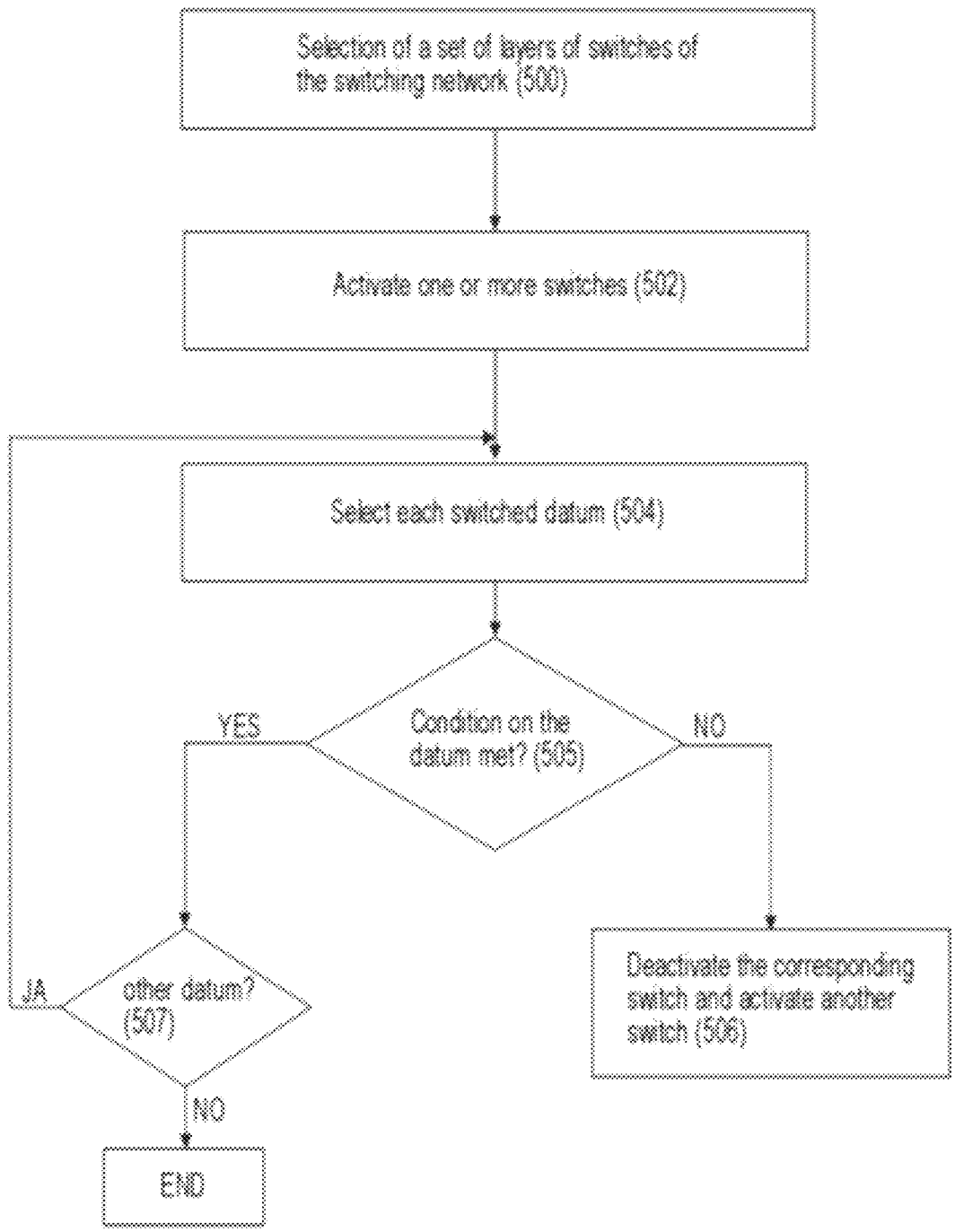
FIG. 17 is a flowchart showing the configuring method according to certain embodiments.

FIG. 17 is a flowchart showing the method for activating the switches of a switching network 30 of a given level of the tree.

The switching network 30 is made up of layers of switches 300, each layer comprising one or more switches 300, each having one degree.

In step 500, a set of layers of switches 300 of the switching network is selected depending on the sum of the degrees associated with the switches 300 of this set of layers. The set of layers comprises at least one layer. In one embodiment, for the permutation "0", no switches are activated.

In one embodiment, the selected set of layers is such that the sum of the degrees associated with the switches 300 of this set of layers is equal to the shift to be applied (defined by a shift number).

In step 502, in the selected set of layers, certain of the switches are activated. The switches that are activated are those that allow the data of the input bus 201 or of the input sub-bus 2010 to be moved from the left to target locations on the right. The activation of the switches results in a circular shift of the input data of the switching network 13.

In step 504, each datum thus switched may be tested. The values may be tested from left to right.

Thus, in step 505, it is determined whether a condition relating to the tested datum after the permutation (initially the left-most datum) is met. This condition may consist in determining whether the datum, which is brought to the position in question by each permutation applied in step 502 and which corresponds to an activated switch (initially the left-most position), is positioned on the desired line of the output bus of the switching network. If the condition is not met, in step 506, another switch 300 of the sub-set selected in step 500, and that was not activated in step 502, may be activated to replace the switch in question without affecting the permutations performed beforehand. If the test datum is well-placed (condition 505 met), steps 504 and 507 are repeated iteratively in order to check whether the following data (507) are well placed.

If the number of switched lines of the input bus 201 is lower than half the number of lines (201) in the bus 201, the found configurations may be repeated as many as times as possible on the input bus.

Figure 18:
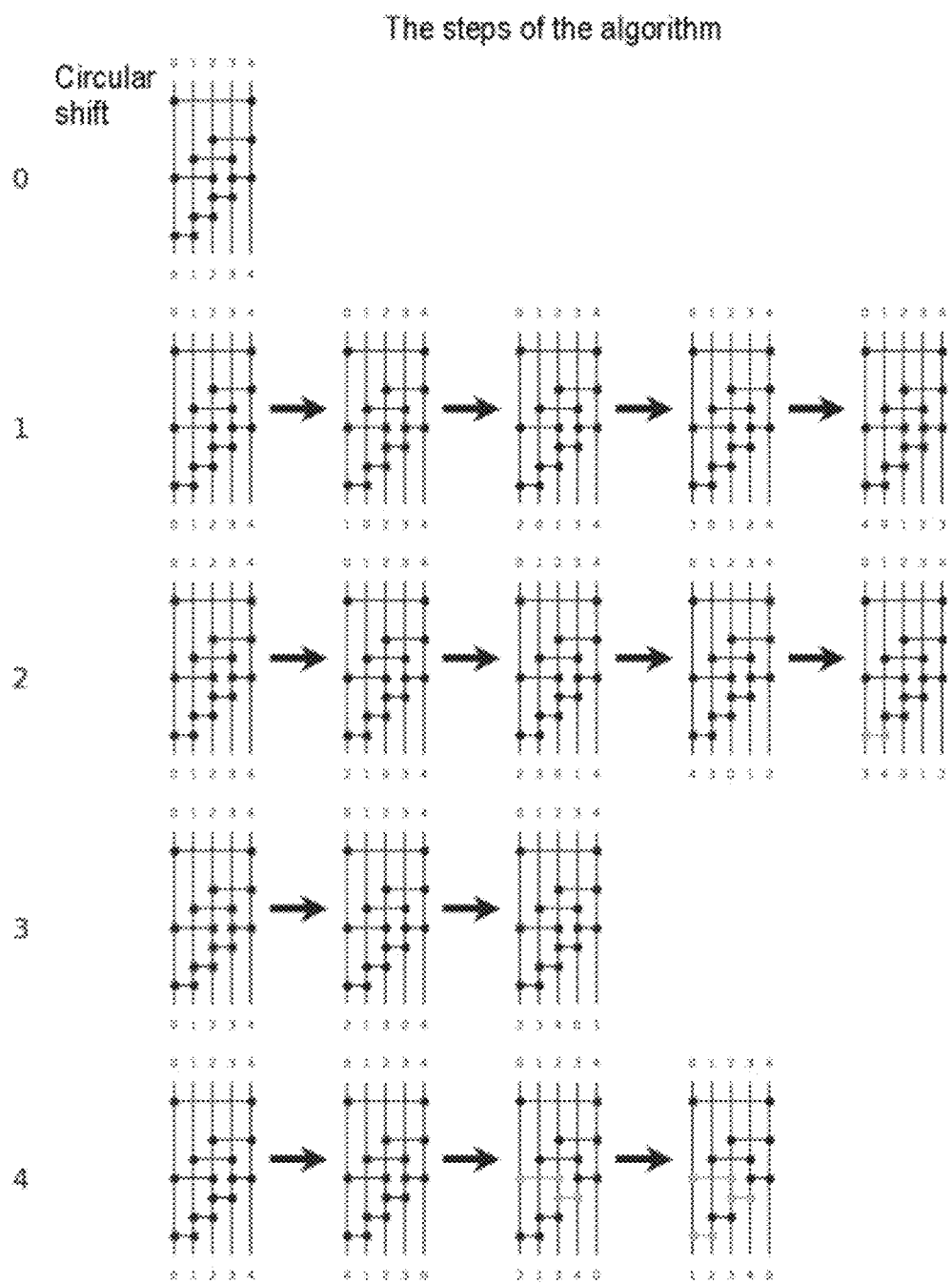
FIG. 18 illustrates the configuring method for a shift of 5 lines on a 5-line bus for the 5 possible shifts in a $2^n$-type layer switching network.

FIG. 18 illustrates the successive steps of the switch-activating method for an example of an embodiment of a $2^n$-type layer switching network, for all the 5-line shifts on a 5-line input bus in a $2^n$-type layer switching network. The switches in red are activated in step 500 whereas the switches in green are activated in step 504.

When all the configurations of the switches 300 have been determined, these configurations may be formalized in the form of a logic circuit or of a look up table controlled by a control bus and by a configuration bus. The input configuration of the routing for a given input event delivers the size of the processed filter, the control and/or the number of circular shifts to be applied.

Figure 19:
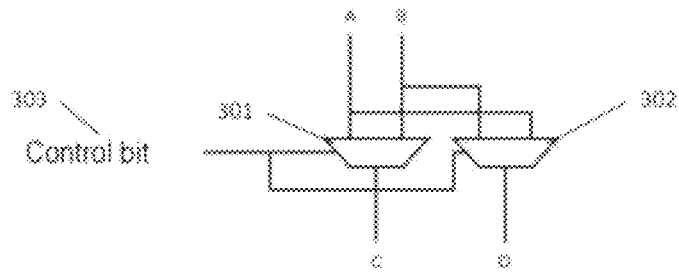
FIG. 19 shows an example of a digital two-state switch, according to certain embodiments.

FIG. 19 shows an example implementation of a digital 2-state switch able to be used in the switching networks 30 of the routing device 200.

The 2-state switch 300 of FIG. 19 is produced using 2 multiplexers 301 and 302 that receive the same inputs and that share the same control bit 303. The inputs of the multiplexers are however inverted (in the example, the multiplexer 301 receives the inputs A and B whereas the multiplexer 302 receives the inputs B and A). The input buses of the multiplexers 301/302 may be any size: the switch 300 may thus switch buses of any size. In the example of FIG. 19, when the control bit 303 is at 0, the datum A is routed to C and the datum B is routed to D.

Conversely, when the control bit is at 1, the datum A is routed to D and the datum B is routed to C.

Figure 20:
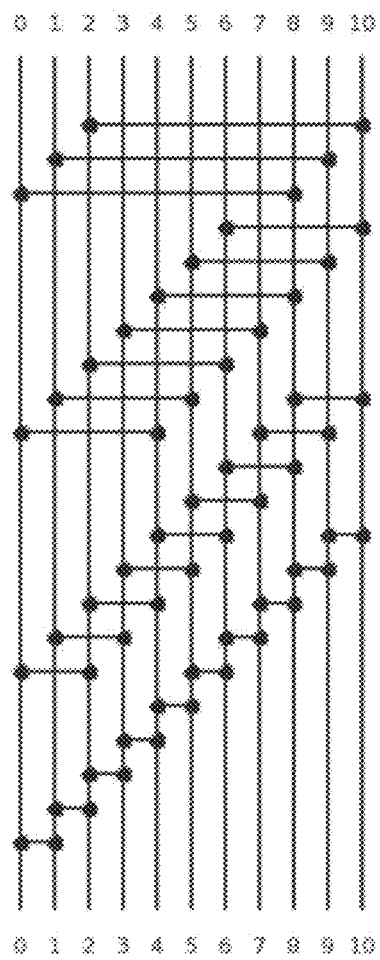
FIG. 20 shows an example of a switching network for a 11-line bus with $2^n$-type layers.

FIG. 20 shows an example of a switching network 30 of an 11-line input bus 201 with $2^n$-type layers able to use such a two-state switch 300. The switching network of the input bus comprises $\lfloor \log 2(11) \rfloor = 3$ $2^n$-type layers, i.e. $n \in [0, 3]$. The switching network 30 therefore contains layers of degree 8, 4, 2 and 1 and 29 switches 300. A switching network 30 having such a structure allows any circular permutation of a bus of 11 lines and of all of its sub-buses. Thus, the list of circular shifts able to be applied by such a switching network comprises:

- All the shifts of an 11-line bus;
- All the shifts of a 10-line bus;
- All the shifts of a 9-line bus;
- All the shifts of an 8-line bus;
- All the shifts of a 7-line bus;
- All the shifts of a 6-line bus;
- All the shifts of 2 5-line sub-buses;
- All the shifts of 2 4-line sub-buses;
- All the shifts of 3 3-line sub-buses;
- All the shifts of 5 2-line sub-buses.

Such a switching network 30 may be controlled by one control word (29 bits in this example) delivered by the decoder 32 associated with the switching network 30. Each bit of the control word is associated with one of the switches 300 of the switching network 30. The value of each bit of the control word controls the activation state of the associated switch 300 (for example, the value 1 controls the activation of the associated switch whereas the value 0 leaves the switch in the inactivated state).

Since the switches 300 are arranged in layers of degree deg, the number of switches in a given layer is:

$N - 2^n = N - \deg_n$ where $N$ is the number of elements in the bus.

Since the number of layers is equal to $\lfloor \log 2(N) \rfloor$, the total number of switches is therefore $\Sigma_{n=0}^{\lfloor \log 2(N) \rfloor}(N-2^n)$, $2^n = \deg_n$.

In one example of implementation of the routing device 200 using switching networks in the configurations of FIGS. 19 and 20 (29 switches per switching network), for a convolution matrix of 11×11×1 size, the input bus comprises 121 lines (11×11) that are divided into 11 packets of 11 lines forming the 11 input sub-buses 2010. Since the filter has two dimensions (2-D matrices defined along two axes X and Y), the depth of the tree is 2 (the tree has two levels). The tree contains 12 nodes each representing one switching network. The routing device 200 therefore uses 12 switching networks (30) and 29×12=348 switches (300). The shift tree may be parameterized to handle any matrix of 11×11 to 1×1 size. The parameterization word 203 may be represented by 4 bits and the control word 4+4=8 bits.

Embodiments of the invention thus make it possible, on the basis of the address of the input event, to find the target shift for reordering the data of a convolution filter to be transferred to the processing units 20 in a processor 100 based on a convolutional-neural-network architecture.

The routing device 200 allows a dynamic activation of the switches of the switching networks using decoders 32 that are parameterizable depending on the input event, on the maximum size of the convolution kernel and/or on the shift to be applied.

It allows the weight coefficients carried by the input vector (input bus) to be reordered depending on the input events (spikes for example) and on parameters of the network, by applying controlled circular permutations.

The invention provides a solution that allows convolution-kernel data to be dynamically routed in neuromorphic processors and in particular in massively parallel neuromorphic processors.

The invention in particular allows parallel and parameterizable routing of data for neuromorphic convolution computations, and parallel distribution and ordering of weight coefficients for a convolution. It enables flexible routing and in particular the creation of independent sub-routings. The routing device 200 adapts dynamically to the size and to the number of dimensions of the convolutions. This results in a complexity decreased by $N^2$ with respect to existing solutions (complexity $N^3$).

The routing device 200 according to the embodiments of the invention may dynamically change the configuration of the switches 300 of the switching networks, on each input event applied to a convolution kernel. The routing device 200 is not only implementable for a maximum convolution-filter dimension and a maximum convolution-filter size, but also for any size of convolution matrix (12) smaller than or equal to the maximum size, or even for a plurality of convolution matrices at the same time. The routing device 200 therefore allows scaling in terms of maximum matrix size and of the number of dimensions of the convolution kernel.

The routing device 200 has a smaller footprint than existing multiplexer-based embodiments.

The shift tree allows the interconnection of the switching networks 30 to be represented and convolution filters to be processed depending on the maximal kernel to be processed, and on the number of dimensions of the convolution filter (defining the depth of the tree).

The topology of the switching networks 30 and the switching layers 30 in the interior of the switching networks allows circular permutations to be performed on the input bus and/or on input sub-buses by dynamically controlling the activation of the switches 30. The dynamic control of the switches 300 and more generally the dynamic configuration of the switching networks 30 depending on the input event are such that the switching networks may apply any circular shift.

The routing device 200 according to the embodiments of the invention may be applied to an input bus of any size in a completely parallel manner, using digital or analogue switches 300.

The routing device 200 may be implemented for digital or analogue signals. Its implementation is furthermore highly flexible (size of the input bus, depth of the tree, etc.). The circular shifts may be applied to the input bus 201, but also to its sub-buses.

Although the invention is particularly advantageous when used in a spiking-neuromorphic-convolutional processor to transfer the values of a convolution filter to processing units 20 forming neuromorphic processing elements 20, the invention is not limited to such an application. As a variant, the invention may be applied to any device in which the coefficients of at least one convolution kernel must be distributed in parallel to processing units.

Those skilled in the art will understand that the method for activating switches 300 according to the embodiments may be implemented in numerous ways by hardware, software or a combination of hardware and software, notably in the form of program code that may be distributed in the form of a program product, in numerous forms. In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

The invention is not limited to the embodiments described hereinabove by way of non-limiting example. It encompasses all the variant embodiments that may be contemplated by the person skilled in the art. In particular, the invention is not limited to a spiking convolutional neural network. Moreover, the invention is not limited to a number of dimensions equal to 2 or 3, as illustrated in the above examples.

The invention claimed is:

1. A device for distributing the convolution coefficients of a least one convolution kernel of a convolutional neural network, said coefficients being carried by an input bus, to a set of processing units in a processor based on a convolutional-neural-network architecture, wherein the device comprises at least one switching network that is controlled by at least one control unit, the switching network comprising a set of switches that are arranged to apply circular shifts to at least one portion of the input bus, and in that, for each convolution kernel, each control unit is configured to dynamically control certain at least of the switches of the switching networks in response to an input event applied to the convolution kernel and at least one parameter representing the maximum size of the convolution kernels.

2. The device as claimed in claim 1, wherein each convolution kernel is represented by a convolution matrix of given size in a coordinate system of chosen dimensions, and in that the switching networks are interconnected to one another by a tree structure, called the shift tree, said tree comprising a set of nodes, each node representing one switching network, and a set of levels, the number of levels in the tree being determined on the basis of the number of dimensions of said coordinate system, the size of the input bus being defined on the basis of the maximum convolution-kernel size.

3. The device as claimed in claim 2, wherein each level of the tree corresponds to a given dimension of said coordinate system, and in that the switching networks arranged in a given level of the tree are configured to circularly shift the data of the input bus in the dimension associated with said level.

4. The device as claimed in claim 2, wherein the convolution matrix representing each convolution kernel comprises a set of columns, and in that the routing device is configured to divide the input bus into a set of input sub-buses depending on the number of columns in the convolution matrix, the convolution coefficients of each input sub-bus being associated with one of said switching networks in a first level of the tree, each switching network in said first level being configured to apply circular shifts to the coefficients of the input sub-buses depending on an input event applied to the convolution kernel, the output of each switching network of the first level of the tree being delivered as input to an intermediate data bus in the form of an input data vector, the input data vectors of the secondary data bus being switched by a switching network arranged in the second level of the tree.

5. The device as claimed in claim 2, wherein it comprises at least one control unit for controlling the switching networks of a given level of the tree.

6. The device as claimed in claim 1, wherein each switching network comprises a set of switches, which are arranged in superposed layers, for applying a circular shift to the lines of the input bus of the switching network, each layer of switches being activatable by the control unit controlling the switching network, each layer of switches further being configured to perform permutations between two input lines.

7. The device as claimed in claim 6, wherein the switches are two-state switches.

8. The device as claimed in claim 7, wherein each layer of switches has a degree representing the distance between two switched lines of the input bus, and in that the degree of a layer of switches of a switching network is equal to 2 raised to a chosen power value ($2^n$).

9. The device as claimed in claim 8, wherein the power value chosen for a given layer of switches is equal to the integer part of log 2(N), where N is the number of lines of the input bus.

10. The device as claimed in claim 5, wherein the switching network is configured to apply a plurality of circular shifts of size smaller than the number of lines of the input bus.

11. The device as claimed in claim 5, wherein the switching network is configured to apply a circular shift of size equal to the number of lines of the input bus.

12. The device as claimed in claim 1, wherein the convolutional neural network comprises an input matrix, the input matrix comprising a set of input neurons, the input matrix being connected to an output matrix by convolution kernels, and in that the input event is the address of the input neuron to be activated in the input matrix of the convolutional neural network, the routing device being able to determine the number of lines, of the input bus, to which a circular shift is to be applied depending on the input address.

13. The device as claimed in claim 1, wherein the convolutional neural network is a spiking network and in that the input event is defined by the address of the spike received by the input matrix.

14. A neuromorphic processor comprising a memory for storing the coefficients of convolution kernels and a set of processing units for computing the response of a neural network to an input event, wherein it comprises a routing device as claimed in claim 1, for distributing the coefficients to the processing units.

* * * * *